United States Patent
Adachi et al.

(10) Patent No.: US 7,173,760 B2
(45) Date of Patent: Feb. 6, 2007

(54) LUMINOUS INTENSITY DISTRIBUTION CONTROL DEVICE AND DISPLAY HAVING THE SAME

(75) Inventors: Masaya Adachi, Hitachi (JP); Makoto Tsumura, Hitachi (JP); Ikuo Hiyama, Hitachi (JP); Tetsuro Minemura, Hitachioota (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/222,777

(22) Filed: Sep. 12, 2005

(65) Prior Publication Data

US 2006/0017860 A1 Jan. 26, 2006

Related U.S. Application Data

(63) Continuation of application No. 10/669,052, filed on Sep. 24, 2003, now Pat. No. 6,943,947, which is a continuation of application No. 09/743,495, filed as application No. PCT/JP99/03593 on Jul. 2, 1999, now Pat. No. 6,650,472.

(30) Foreign Application Priority Data

Jul. 10, 1998 (JP) ................. 10-195736

(51) Int. Cl.
| G03B 21/60 | (2006.01) |
| G03B 21/14 | (2006.01) |
| G02B 5/30 | (2006.01) |
| G02F 1/1335 | (2006.01) |
| G09G 3/18 | (2006.01) |
| G09G 3/36 | (2006.01) |
| H04N 5/74 | (2006.01) |

(52) U.S. Cl. .................. 359/453; 359/456; 359/460; 359/437; 359/501; 349/5; 349/194; 345/38; 345/50; 345/87; 345/104; 348/751; 348/761; 348/766; 348/790; 353/8; 353/20

(58) Field of Classification Search ........ 359/452–457, 359/460, 437, 501; 349/5, 194; 345/38, 345/50, 87, 104; 348/751, 761, 766, 790; 353/8, 20

See application file for complete search history.

(56) References Cited

U.S. PATENT DOCUMENTS 5,504,598 A 4/1996 Sprague et al.

(Continued)

FOREIGN PATENT DOCUMENTS

JP 07-205323 8/1995

(Continued)

*Primary Examiner*—W. B. Perkey
*Assistant Examiner*—Magda Cruz
(74) *Attorney, Agent, or Firm*—Antonelli, Terry, Stout and Kraus, LLP.

(57) ABSTRACT

A liquid crystal display apparatus including: a liquid crystal display element having a liquid crystal layer between a couple of substrates; a backlight apparatus arranged at one side of the couple of substrates; a polarizer arranged between the liquid crystal display element and the backlight apparatus; a luminous intensity distribution control element arranged at the other side of the couple of substrates; an analyzer arranged between the liquid crystal display element and the luminous intensity distribution control element, wherein the luminous intensity distribution control element comprises a transparent base member, a plural lenses arranged on the transparent base member, and a light absorbing layer having small opening portions substantially at focal positions of an individual lens of the plural lenses, and the transparent base member is constituted of a transparent body substantially optically isotropic or a transparent body having uniaxial optical anisotropy.

12 Claims, 27 Drawing Sheets

1201: LIGHT SOURCE
1202: LIGHT GUIDING MEMBER
1203: LIGHT COLLIMATING MEANS
1204: POLARIZER
1214: ANALYZER
1215: EMITTING LIGHT
1301: BACKLIGHT APPARATUS
1302: LIQUID CRYSTAL DISPLAY ELEMENT

U.S. PATENT DOCUMENTS

| | | |
|---|---|---|
| 5,550,656 A * | 8/1996 | Sprague et al. .............. 349/5 |
| 5,587,816 A | 12/1996 | Gunjima et al. |
| 5,629,785 A | 5/1997 | Valliath et al. |
| 5,712,694 A | 1/1998 | Taira et al. |
| 6,104,454 A | 8/2000 | Hiyama et al. |
| 6,261,402 B1 | 7/2001 | Watanabe et al. |
| 6,262,840 B1 | 7/2001 | Watanabe et al. |
| 6,469,755 B1 | 10/2002 | Adachi et al. |
| 6,650,472 B1 | 11/2003 | Adachi et al. |

FOREIGN PATENT DOCUMENTS

| | | |
|---|---|---|
| JP | 08-006023 | 1/1996 |
| JP | 09-281483 | 10/1997 |
| JP | 09-318801 | 12/1997 |

* cited by examiner

100: LIGHT DISTRIBUTION CONTROL ELEMENT
101: TRANSPARENT BASE MEMBER
102: TRANSPARENT ADHERING AGENT LAYER
103: COLORED ADHERING AGENT LAYER
104: ADHERING AGENT LAYER
105: TRANSPARENT BEAD
106: INCIDENT LIGHT
107: UNNECESSARY LIGHT

EMITTING CHARACTERISTIC AT INCIDENCE OF POLARIZED LIGHT (EQUI-BRIGHTNESS DIAGRAM)

CIRCULAR CUT FACE
OF INDEX ELLIPSOID

OSCILLATION DIRECTION
OF ELECTRIC VECTOR OF
INCIDENT LINEARLY
POLARIZED LIGHT

EMITTING CHARACTERISTIC AT
INCIDENCE OF POLARIZED LIGHT
(EQUI-BRIGHTNESS DIAGRAM)

701: PROJECTING APPARATUS
702: MIRROR
703: TRANSMISSION TYPE SCREEN
704: PROJECTED LIGHT BEAM

801: LIGHT SOURCE
802, 803: DICHROIC MIRROR
804, 805, 806: TOTAL REFLECTION MIRROR
807, 808, 809: LIQUID CRYSTAL DISPLAY ELEMENT
811: COLOR SYNTHESIZING CROSS DICHROIC PRISM
812, 813, 814: POLARIZED STATE ALIGNING MEANS 901,902: TRANSPARENT GLASS SUBSTRATE
903,904: TRANSPARENT ELECTRODE
905,906: ORIENTATION FILM
907: LIQUID CRYSTAL LAYER
908: SEALING AGENT   909: POLARIZER
910: ANALYZER

801f: FRESNEL LENS 1001, 1002 : TRANSPARENT SUBSTRATE
1003, 1004 : ORIENTATION FILM
1005 : SEALING AGENT
1006 : LIQUID CRYSTAL LAYER 912, 1007 : LIQUID CRYSTAL ORIENTATION DIRECTION

815: POLARIZED STATE CONVERTING ELEMENT 2501, 2502: TRANSPARENT GLASS SUBSTRATE
2503, 2504: TRANSPARENT ELECTRODE
2505: POLYMER DISPERSING LIQUID CRYSTAL LAYER
2507: POLYMER

2500: POLYMER DISPERSION TYPE
      LIQUID CRYSTAL ELEMENT
2701, 2702, 2802: LENS
2801: LIGHT SOURCE
2803, 2817: DIAPHRAGM 2813, 2814, 2815: POLYMER DISPERSION TYPE LIQUID CRYSTAL ELEMENT
2819: PROJECTING LENS

3000 : PSEUDO-DEPOLARIZER

1201: LIGHT SOURCE
1202: LIGHT GUIDING MEMBER
1203: LIGHT COLLIMATING MEANS
1204: POLARIZER
1214: ANALYZER
1215: EMITTING LIGHT
1301: BACKLIGHT APPARATUS
1302: LIQUID CRYSTAL DISPLAY ELEMENT

3100: PHASE CONTRAST PLATE

3401: MICRO-TRANSPARENT ROD

3501: TRANSPARENT BASE MEMBER
3502: MICRO-LENS
3503: LIGHT ABSORBING LAYER

4001: REAR PROJECTION TYPE DISPLAY APPARATUS
4002: OBSERVER SENSING UNIT
4100: OBSERVER

LUMINOUS INTENSITY DISTRIBUTION CONTROL DEVICE AND DISPLAY HAVING THE SAME

CROSS-REFERENCE TO RELATED APPLICATIONS

This application is a continuation of application Ser. No. 10/669,052, filed Sep. 24, 2003 now U.S. Pat. No. 6,943,947, which is a continuation of application Ser. No. 09/743,495 filed Jan. 10, 2001 now (U.S. Pat. No. 6,650,472), which is a §371 national stage of PCT/JP99/03593 filed Jul. 2,1999, and this continuation is related to application Ser. No. 10/642,225 filed Aug. 18, 2003 (now U.S. Pat. No. 6,844,968).

TECHNICAL FIELD

The present invention relates to a light distribution control element which can be used as a transmission type screen member of a rear projection type display apparatus or a viewing angle expanding member of a liquid crystal display apparatus or the like, and a display apparatus using the light distribution control element.

BACKGROUND ART

A rear projection type display apparatus can comparatively easily realize large screen display in a reduced size and at a low cost in comparison with a direct sight type CRT, and therefore, its demand is increasing centering on North American markets. Particularly, unlike a rear projection type display apparatus using a CRT projection tube, highly fine display without any blur can be carried out to peripheral portions of a screen by dot matrix display, according to a rear projection type display apparatus having a projecting apparatus using a liquid crystal display element of a TN (Twisted Nematic) liquid crystal or the like as a two-dimensional optical switch element, and therefore, such a rear projection type display apparatus is expected as a prospective product of a high resolution digital television.

FIG. 11 is a schematic sectional view of a rear projection type display apparatus. A transmission type screen 703 is irradiated with a projected light beam 704 emitted from a projecting apparatus 701 via a mirror 702, and an image is displayed on a front face thereof.

As shown in FIG. 38, a transmission type screen 703 is normally constituted of a Fresnel lens sheet 1402 and a lenticular lens sheet 1401, and the Fresnel lens sheet 1402 is an optical part which operates similarly to a convex lens and functions of widening a suitable viewing range by bending a direction of a main light beam from the projecting apparatus 701 toward an observer.

The lenticular lens 1401 effectively distributes a limited projected light flux from the projecting apparatus 701 to an observing range of the observer to thereby provide a bright image as its object.

FIG. 36 is a schematic sectional view showing an example of a lenticular lens, and FIG. 37 is a schematic perspective view of the lenticular lens.

In the lenticular lens 1401, a plurality of cylindrical lenses 1501 are arrayed in one direction and black stripes 1502 are provided at portions other than portions for condensing a light beam, thereby restraining a contrast ratio with regard to an ambient light beam from lowering without any loss of the projected light beam ideally by disposing focal positions of the lenses 1501 on an observing face of a screen.

Generally, by arraying the lenticular lenses such that generators thereof are directed orthogonally to a display face, a wide viewing angle is provided in the horizontal direction. Therefore, a light beam is distributed in the vertical direction only by diffusion by a diffusing member blended in a base material of the lenticular lenses or surface portions thereof, and accordingly, a viewing angle in the vertical direction is considerably narrower than that in the horizontal direction. Further, according to the lenticular lens, lenses having a linear shape are regularly arranged, and therefore, moire interference fringe is liable to occur on the image.

In contrast thereto, Japanese Unexamined Patent Publication No. 2-77736 discloses a transmission type screen having a constitution in which a transparent base member 1601 is covered with spherical lenses 1602 which are fixed by a transparent resin, as shown in FIG. 39. According to the constitution, no die is used, and therefore, there is no restriction in size in view of fabrication and a seamless transmission type screen having a large screen can be realized. Further, a light beam incident from a side of the spherical lenses is converged by the lens effect of the spherical lenses and is diverged isotropically, and therefore, wide viewing angles are provided both in the horizontal and vertical directions.

Further, there is published a screen having a structure in which optical beads are fixedly attached on a transparent base member via a light-absorbing adhering agent layer and surfaces of the optical beads on the opposite side of the transparent base member are back-coated transparently in SID94 DIGEST pp. 741–744 (A Novel High-Resolution Ambient-Light-Rejecting Rear-Projection Screen).

Further, Japanese Unexamined Patent Publication No. 9-318801 discloses a plane type lens having a structure in which very small spherical transparent beads are fixed on a transparent base member by a colored hot melt adhering agent layer and a transparent hot melt adhering agent layer. According to the structure, like Japanese Unexamined Patent Publication No. 2–77736, by the lens effect of the beads, there is provided isotropic viewing angles which are wide both in the horizontal and vertical directions. Further, an unnecessary light beam incident from outside is absorbed by a light-absorbing adhering agent layer (or colored hot melt adhering agent layer), and therefore, a high contrast ratio is provided even in a bright environment. Further, high resolution can be realized comparatively easily by reducing the diameter of the bead.

The above-described conventional plane type lens (hereinafter, referred to as a light distribution control element) is fabricated as follows: a flat polyethylene terephthalate (PET) resin film having a thickness of 120 μm is used as the transparent base member; a transparent adhering agent layer comprising a polyester-based hot melt adhering agent is formed in a thickness of 5 μm on a surface of the resin film; a colored adhering agent layer, in which the same polyester-based hot melt adhering agent is blended with 10 parts by weight of carbon black, is formed on the transparent adhering agent layer; and the entirety is solidified once.

Spherical transparent beads made of glass having a refractive index of 1.935 (wavelength: 589.3 nm) and a diameter of 50 μm are densely arranged to be dispersed on the entirety. While heating to soften the transparent adhering agent layer and the colored adhering agent layer in a thermostatic chamber, the transparent beads are pressed toward the transparent base member by a pressing plate, to thereby make the transparent beads embed in and fixedly adhere to the colored adhering agent layer and the transparent adhering agent layer. The thickness of the adhering layer after fixation is about 21 µm by adding those of the transparent adhering agent layer and the colored adhering agent layer, and the transparent beads are exposed from the adhering agent layer by about 58% of a diameter thereof.

When the fabricated light distribution control element is evaluated as a transmission type screen of a rear projection type display apparatus having a projecting apparatus using a TN type liquid crystal display element as a two-dimensional optical switch element (light bulb), there are provided wide viewing angles equal to or larger than 50 degree (in this case, an angle giving a brightness half of a front brightness) both in the horizontal direction and the vertical direction, and an unnecessary light beam incident from outside (an observer side) on the light distribution control element is absorbed by the colored adhering agent layer and black display at low brightness can be realized even under bright environment.

However, when an image projected on the light distribution control element is observed in an oblique direction, it is found that a fringe pattern substantially in shapes of concentric circles emerges and the image quality is significantly deteriorated. Further, it is also found that when observed in an oblique direction, a change in chromaticity unfavorable to the image is caused.

It is an object of the present invention to provide a light distribution control element without inducing any deterioration in image quality caused by occurrence of the above-described fringe pattern and a display apparatus having the high brightness, high contrast ratio and high viewing angle using the light distribution control element. Objects other than the above-described object will become apparent self-evidently from the following description.

DISCLOSURE OF INVENTION

The inventors have investigated in further details on the above-described conventional light distribution control element in order to find the cause of the occurrence of fringe patterns and the change in chromaticity. As a result, it has been found that the fringe pattern is produced when polarized light is incident on the light distribution control element, various phase differences are produced in light progressing at different angles in a transparent base member owing to optical anisotropy of the base member and the fringe pattern is produced by a difference between energy transmittances of a p polarized light component and an s polarized light component of light emitted from the transparent base member in combination with the phase difference. Further, it has been found that the change in chromaticity is caused since the light distribution characteristic of the light distribution control element is changed depending on the polarized state of incident light. The following is the gist of the present invention reached based upon the above-described findings.

[1] There is provided a light distribution control element including a transparent base member, a number of micro-lenses densely arranged on one face of the transparent base member and a light absorbing layer having very small opening portions substantially at focal positions of the micro-lenses, wherein the light distribution control element is characterized in that the transparent base member is constituted of a transparent body which is substantially isotropic optically or a transparent body having uniaxial optical anisotropy.

By using the light distribution control element, occurrence of a fringe pattern at the time of the incidence of polarized light is eliminated by restraining a phase difference influenced on an image quality from being caused.

[2] There is provided a rear projection type display apparatus including a projecting apparatus for projecting an optical image and a transmission type screen, on a rear face of which projected light from the projecting apparatus is incident, for displaying the projected light at a front face thereof, a rear projection type display apparatus characterized in that the projecting apparatus comprises a single tube type projecting apparatus having a light source, two-dimensional optical switch elements for modulating light from the light source into an optical image in accordance with image information and a projecting lens for enlarging and projecting the optical image after the modulation, and further comprises polarized light state aligning means for making polarized states of optical image lights formed by the two-dimensional optical switch elements substantially coincide with each other over the entire region of visible wavelengths when the optical image after the modulation emitted from the projecting apparatus is incident on the transmission type screen; and the transmission type screen is constituted of a light distribution control element including a transparent base member, a number of micro-lenses densely arranged on one face of the transparent base member and a light absorbing layer having very small opening portions substantially at focal positions of the micro-lenses, the transparent base member being constituted of a transparent body which is substantially isotropic optically or a transparent body having uniaxial optical anisotropy, and light flux collimating means provided on a projected light incident side of the light distribution control element.

As described above, the polarized states of the projected lights incident on the light distribution control elements (optical image lights) coincide with each other in the entire region of visible wavelengths. Accordingly, there is caused no staining derived from polarized light dependency of light distribution characteristics of the light distribution control element, and there can be realized display having a high image quality without any change in chromaticity even observed in an oblique direction.

Further, image light incident on the light distribution control element is brought into a substantially parallel state and is incident thereon substantially at an angle of incidence of 0 degree, and accordingly, there is provided a bright display image by restraining transmittance of the light distribution control element from lowering.

[3] There is provided the rear projection type display apparatus, wherein the two-dimensional optical switch element is a two-dimensional optical switch element for executing display by utilizing polarized light, the two-dimensional optical switch element comprising polarized light state converting means for converting a polarized light state of optical image light formed by the two-dimensional optical switch element into any of a polarized light state of linearly polarized light having an oscillation direction of an electric vector directed in a horizontal direction relative to a display face of the transmission type screen, linearly polarized light directed in a vertical direction, circularly polarized light and elliptically polarized light.

As described above, the polarized light state of the optical image light incident on the light distribution control element can be controlled, and accordingly, there can be realized the rear projection type display apparatus in which the viewing angle characteristic can easily be changed by the polarized light dependency of the light distribution characteristic of the light distribution control element even when the constitution of the transmission type screen is not changed.

[4] There is provided the rear projection type display apparatus further comprising an observer sensing unit for sensing the presence or absence of an observer, observer position determining means for determining positions of the observer in the horizontal and vertical directions by a sensed signal of the observer sensing unit, and control signal outputting means for outputting a control signal to a polarized light state converting element based on information of the observer position determining means.

As described above, there can be provided the viewing angle characteristic in accordance with the positions of the observer by automatically determining the positions of the observer and changing the polarized light state of projected light based on the position information. That is, the viewing angle characteristic is automatically changed in accordance with the positions of the observer, limited image light is effectively distributed in a direction of the observer and excellent image is provided to the observer.

[5] There is provided the rear projection type display apparatus featured in that the projecting apparatus comprises a single tube type projecting apparatus having a light source, two-dimensional optical switch elements for modulating light from the light source into an optical image in accordance with image information and a projecting lens for enlarging and projecting the optical image after the modulation, the transmission type screen comprises a light distribution control element having a transparent base member, a number of micro-lenses densely arranged on one face of the transparent base member and a light absorbing layer having very small opening portions substantially at focal positions of the micro-lenses and light flux collimating means arranged on a projected light incident side of the light distribution control element, and further comprises unpolarized light forming means for converting projected light emitted from the projecting apparatus and incident on the transmission type screen into substantially unpolarized light.

As described above, the optical image light incident on the light distribution control element constituting the transmission type screen is converted into the unpolarized light, and accordingly, there is caused no change in chromaticity derived from the polarized light dependency of the light distribution characteristic of the light distribution control element. Further, there is caused no fringe pattern produced at the time of incidence of polarized light by the optical anisotropy of the transparent base member of the light distribution control element, and accordingly, there can be provided a beautiful image without any deterioration in image quality. Further, even when a transparent body having optical anisotropy is used as the transparent base member, there is no deterioration in image quality, and accordingly, a range of selecting the material is widened, and there can be realized the transmission type screen comprising the light distribution control element which is further inexpensive and is provided with high strength.

[6] There is provided a liquid crystal display apparatus including a pair of transparent substrates formed of a lamination of transparent electrodes and orientation films and bonded to each other with a constant clearance therebetween while orientation films formed faces opposed to each other, a liquid crystal layer enclosed in the clearance, voltage applying means for applying a voltage corresponding to an image signal across the transparent electrodes and a polarizer and an analyzer disposed on a light incident face side and a light emitting face side of the pair of transparent substrates, the liquid crystal display characterized in that a rear face of each of the pair of transparent substrates is provided with a backlight apparatus for emitting substantially parallel light and the light emitting face side of the pair of transparent substrates is provided with a light distribution control element comprising a transparent base member, a number of micro-lenses densely arranged on one face of the transparent base member and a light absorbing layer having very small opening portions substantially at focal positions of the micro-lenses, the light distribution control element being a light distribution control element in which the transparent base member is constituted of a transparent body which is substantially isotropic optically or a transparent body having uniaxial optical anisotropy.

Thereby, only light within a limited range in the vicinity of the front face capable of achieving an excellent image quality can be isotropically diverged by the light distribution control element, and accordingly, there can be realized the liquid crystal display apparatus capable of providing an image having a high contrast ratio without any change in chromaticity and no inversion of a gray scale within a wide viewing angle range.

[7] There is provided the liquid crystal display apparatus, wherein the light incident face side of each of the pair of transparent substrates is provided with a polarizer and the light emitting face side is provided with an analyzer and the light distribution control element in this order from a side of the transparent base member, and a transmission axis of linearly polarized light of the analyzer is arranged in a horizontal direction relative to a display face.

In this way, by the polarized light dependency of the light distribution characteristic of the light distribution control element, a viewing angle in the horizontal direction becomes wider than that in the vertical direction relative to the display face and limited light can be effectively distributed to an observer.

[8] There is provided the liquid crystal display apparatus, wherein the light incident face side of the pair of transparent substrates is provided with a polarizer, the light emitting face side is provided with an analyzer and the light distribution control element in this order from a side of the transparent substrate, and a phase contrast plate is interposed between the analyzer and the light distribution control element.

Thereby, the polarized state of light incident on the light distribution control element can be arbitrarily changed by the phase contrast plate arranged between the analyzer and the light distribution control element, and accordingly, only by changing the phase contrast plate, a desired viewing angle can be provided by utilizing the polarized light dependency of the light distribution characteristic of the light distribution control element.

BEST MODES FOR CARRYING OUT THE INVENTION

An explanation will be given of embodiments according to the present invention in reference to the drawings.

Figure 1:
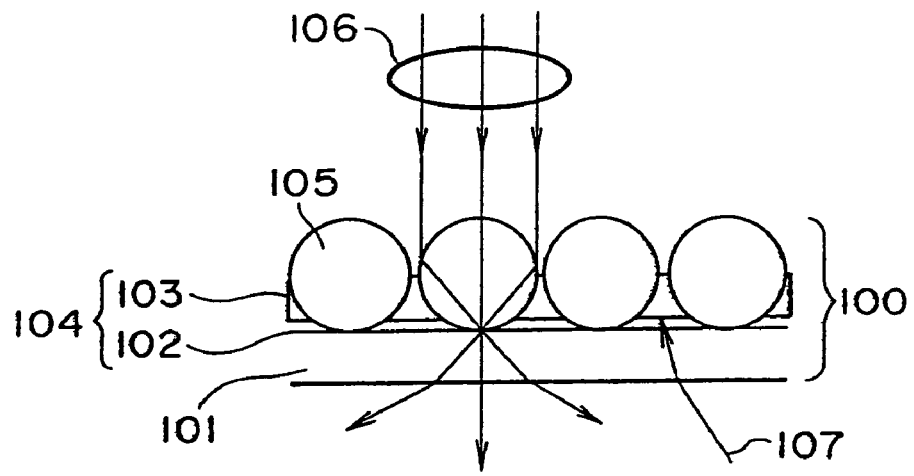
FIG. 1 is a schematic sectional view of a light distribution control element according to the present invention.
Figure 2:
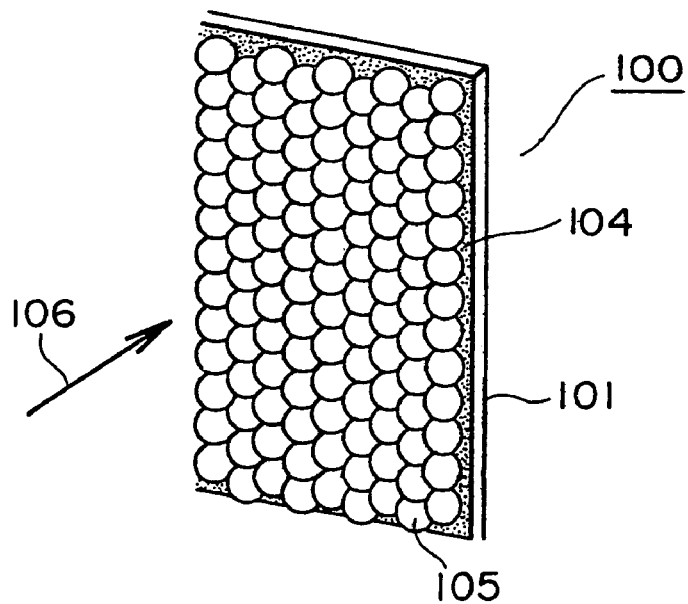
FIG. 2 is a schematic perspective view of the light distribution control element according to the present invention.
Figure 3A:
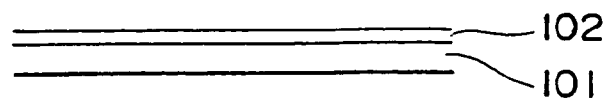
FIGS. 3A–E are schematic sectional views for explaining an example of a method of fabricating the light distribution control element according to the present invention.
Figure 3B:
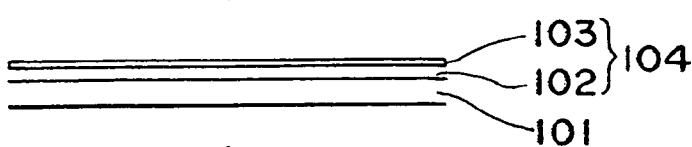
Figure 3C:
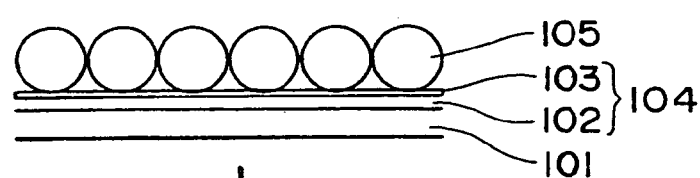
Figure 3D:
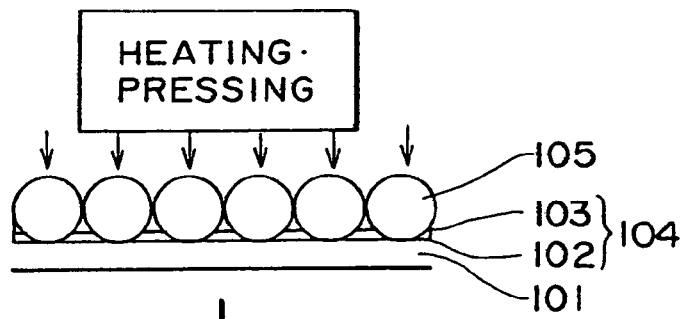
Figure 3E:
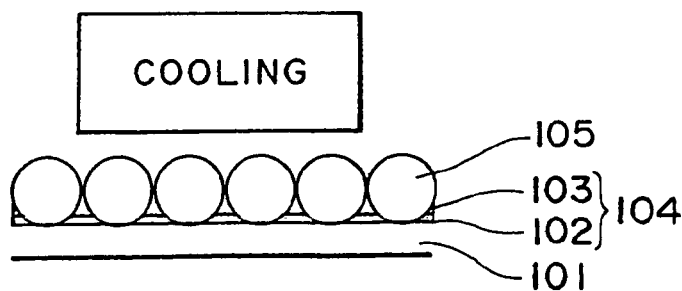

FIG. 1 is a schematic sectional view showing an example of a light distribution control element according to the present invention, and FIG. 2 is a schematic perspective view thereof.

The light distribution control element is constituted of a transparent base member 101, a hot melt adhering agent layer 104 formed on a surface thereof and a plurality of transparent beads 105 each formed into a very small sphere fixed to the adhering agent layer 104.

Although the transparent base member 101 may be a base member in a plate-like shape having a rigidity by itself or a base member in a film-like shape, it is important to use a transparent body which is substantially isotropic optically or which is provided with an uniaxial anisotropy having an optical axis in a direction in parallel with the plate face or the film face.

Specifically, there is used a glass plate, a transparent plate which is substantially isotropic optically such as an acrylic resin plate and which is produced by injection molding, or a transparent film which is fabricated by a casting process or an extrusion process or the like and uniaxially elongated as necessary and which is substantially isotropic optically or which is provided with an optical axis in parallel with the film face and composed of a polycarbonate resin, a vinyl chloride resin, a polyester-based resin, a cellulose-based resin, a polyvinyl alcohol resin, a polyolefin resin or the like.

The hot melt adhering agent layer 104 is constituted such that a transparent layer 102 and a colored layer 103 are laminated in this order. There is used the adhering agent layer having an adhering force sufficient for the transparent base member 101 and the transparent beads 105. There can be used a hot melt adhering agent composed of an acrylic-based resin, a polyester-based resin, a polyamide-based resin, a polyurethane-based resin or the like. There is used the colored layer 103 colored by dispersing a pigment of carbon black or the like on the basis of these adhering agents or colored by dyeing the layer by a dyestuff.

As the transparent bead 105, there is used a spherical bead made of glass or a transparent resin which is optically isotropic. The higher the refractive index, the larger the angle of refraction of light incident on the transparent bead, and accordingly, the wider the light emitting angle (viewing angle) of the light distribution control element. However, a brightness in a front direction is lowered by that amount, reflection on the surface or the interface between the transparent base member 101 and air is increased, and a total light ray transmittance is lowered.

Further, in order to efficiently transmit light through an opening portion of the transparent bead 105 on a side of a light emitting face, that is, a portion thereof where the transparent bead 105 is brought into contact with the transparent adhering agent layer 102, it is advantageous to reduce an area of condensing light incident on the transparent bead on the light emitting face side. In this case, when a medium on a light incident side of the transparent bead is air, by setting the refractive index to about 1.6 through 2.1, the condensing area at the light emitting face can be sufficiently reduced. Further, by setting the above-described refractive index to 1.9 through 2.1, light can be condensed with smaller aberration.

The refractive index of the transparent bead 105 is selected to be compatible with characteristics requested to the light distribution control element, that is, specifications of viewing angle and brightness (gain) in view of these conditions. Further, there can also be used a mixture of transparent beads having different refractive indices as necessary.

When the light distribution control element 100 is used as a screen or viewing angle expanding means of a display apparatus, the diameter of the transparent bead 105 directly influences on the resolution of a displayed image. That is, an image displayed by the light distribution control element cannot be resolved to the diameter of the transparent bead 105 or smaller. Therefore, it is necessary to reduce the diameter of the transparent bead to be smaller than a pixel of an image to be displayed on the light distribution control element.

Although the smaller diameter of the transparent bead 105 easily achieves high resolution when the diameter of the transparent bead 105 is proximate to a wavelength region of light, a factor of scattering transmitted light becomes considerable, brightness or transmittance in a front direction is lowered, and accordingly, the lower limit is prescribed self-evidently.

It is preferable that the diameter of the transparent bead 105 is equal to or smaller than a half of a pixel pitch of a displayed image, and practically, about 20 through 100 µm. Further, the transparent beads 105 are arranged on a surface of the transparent base member 101 uniformly and at a maximum density, and accordingly, it is preferable that a dispersion in the particle size is as small as possible. Actually, when the dispersion in the particle size is converged within 10%, the function as the light distribution control element is satisfied.

Further, the transparent bead 105 having no air bubbles is preferable since bubbles staying inside becomes a factor of lowering the transmittance.

Next, an explanation will be given of a method of fabricating the light distribution control element 100 according to the present invention in reference to FIG. 3.

Step (a): A hot melt transparent adhering agent in a heated and molten state or dissolved by a solvent or dispersed in a solution in a colloidal form is applied to the transparent base member 101 by, for example, spin coating, knife coating, roll coating, spray coating or blade coating to thereby form the transparent adhering agent layer 102.

Step (b): The colored adhering agent layer 103 is laminated thereon by a method similar to that of the transparent adhering agent layer 102 to thereby form the hot melt adhering agent layer 104. At this occasion, in order to prevent the colored adhering agent layer 103 and the transparent adhering agent layer 102 from mixing together, in forming the colored adhering agent layer 103, when the transparent adhering agent layer 102 is brought into a molten state at high temperatures, the temperature is lowered by forced cooling or natural cooling. Further, when the transparent adhering agent layer 102 is brought into a molten state in a solvent or a state of being dispersed in a colloidal form in a solution, the solvent may be evaporated in a desiccator to thereby solidify or partially solidify the transparent adhering agent layer.

Step (c): At least one layer of a plurality of the transparent beads 105 is arranged to disperse on the colored adhering agent layer 103 such that a maximum packing density is achieved. At this occasion, the colored adhering agent layer 103 is not provided with an adhering property in the solidified or partially solidified state, and accordingly, the transparent beads 105 can be comparatively easily arranged to disperse at the maximum packing density.

Step (d): Subsequently, the above-described layer is heated by heating means such as a thermostatic chamber or an infrared ray heater to thereby soften and melt the hot melt adhering agent layer 104 and the transparent beads 105 are embedded into the hot melt adhering agent layer 104, toward the transparent base member 101 by their own weights or pressing means.

Step (e): In a state where the transparent beads 105 are embedded, the temperature of the hot melt adhering agent layer 104 is lowered to normal temperature to thereby solidify the hot melt adhering agent layer and fixedly adhere the transparent beads thereto.

Further, it is preferable to set the depth of embedding the transparent beads 105 into the hot melt adhering agent layer 104 such that 50 through 80% of the diameter of the bead is exposed. When the amount of exposure is smaller than that, an amount of light incident on the transparent bead is lowered owing to absorption by the colored adhering agent layer, and the transmittance is lowered. When the amount of exposure is larger than that, the function of fixedly adhering the beads becomes insufficient.

As described above, steps, there can be provided the light distribution control element according to the present invention, in which one layer of the transparent beads 105 is arranged to disperse substantially at the maximum packing density and a half or more of the diameter is fixedly exposed from the hot melt adhering agent layer 104 to the light incident side.

Next, an explanation will be given of optical operation of the light distribution control element according to the present invention in reference to FIG. 1. According to the light distribution control element 100, as described above, one layer of the transparent beads 105 is arranged to disperse on the light incident face side substantially at the maximum packing density, and a half or more of the diameter of the bead is fixedly exposed from the hot melt adhering agent layer 104 to the light incident side.

Therefore, although a portion of parallel incident light 106 vertically incident on the light distribution control element 100 is absorbed by the colored adhering agent layer 103 at gaps among the transparent beads 105, most of the incident light is incident on the transparent beads 105. The incident light transmits through an opening portion formed at a portion where the transparent bead 105 is brought into contact with the transparent adhering agent layer 102 while being converged by refracting action of the transparent bead 105 and is emitted while transmitting and diverging through the transparent base member 101. That is, light incident on the transparent bead is converged by the lens effect of the transparent bead and is isotropically diverged, and accordingly, there is provided the light distribution control element having an isotropic and wide viewing angle.

Further, unnecessary light 107 incident from outside is absorbed by the colored adhering agent layer 102 and the unnecessary light becomes stray light and is not observed. Therefore, there can be provided the light distribution control element having an excellent effect of reducing stray light derived from outside unnecessary light even under a bright environment and an isotropic viewing angle characteristic in which the element is bright when viewed from any angle by an observer.

[Elimination of Fringe Pattern at the Time of Incidence of Polarized Light]

Next, in order to clarify an effect particular to the light distribution control element according to the present invention, an explanation will be given of occurrence of a fringe pattern which emerges when observed in an oblique direction at the time of incidence of polarized light, which has been the conventional problem.

Figure 4:
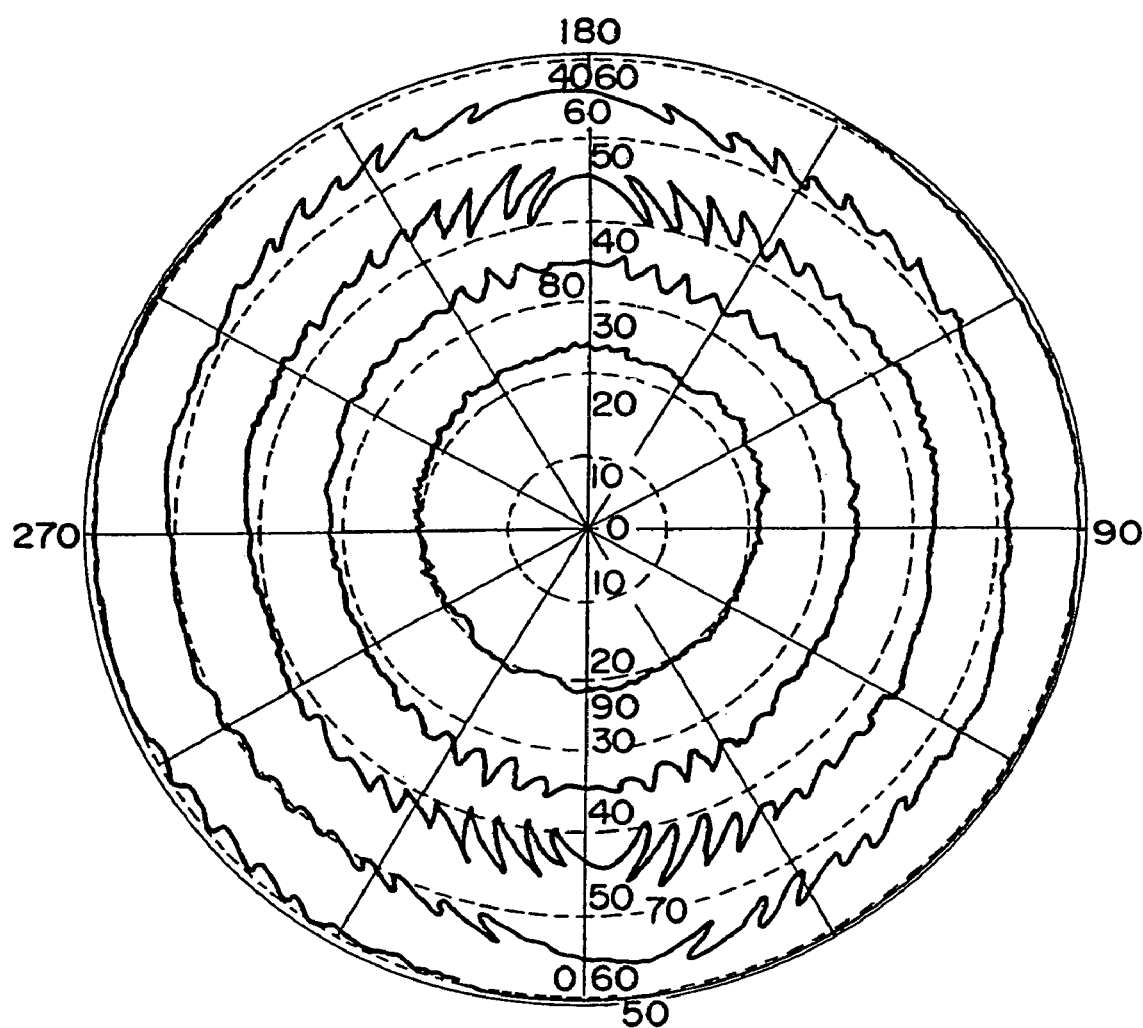
FIG. 4 is an equi-brightness diagram showing light emitting (distributing) characteristics of a conventional light distribution control element when polarized light is incident thereon.

FIG. 4 is an equi-brightness diagram representing light emitting characteristics at the time of incidence of polarized light in a conventional light distribution control element (in which no consideration is given to the problem related to the present invention).

Figure 5:
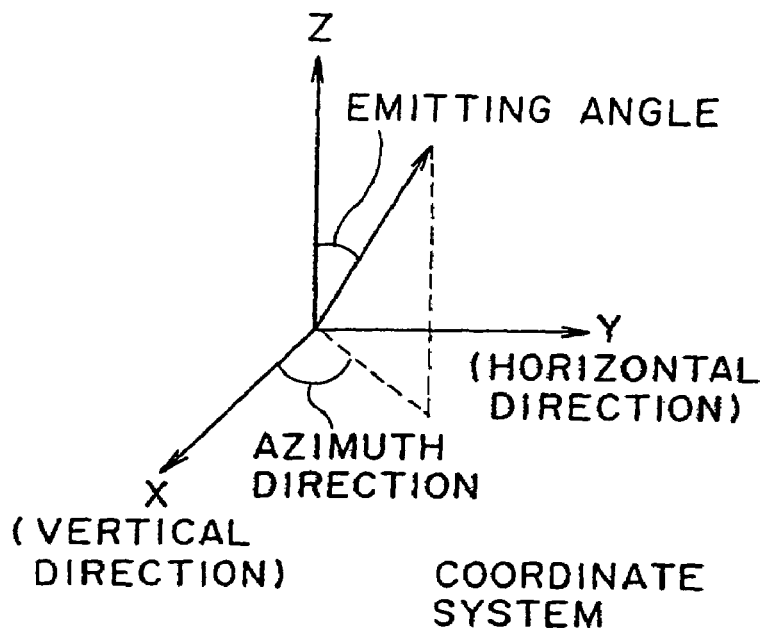
FIG. 5 is an explanatory view of a coordinate system of the equi-brightness diagram.

The equi-brightness diagram is displayed by connecting points having equal brightness at intervals of 10% with maximum brightness as 100% in a coordinate system constituted of an emitting angle and an azimuth angle shown in FIG. 5.

In FIG. 4, the central portion designates an emitting angle of 0 degree (front face) and concentric circles of dotted lines show emitting angles (at intervals of 10 degree). Further, the azimuth angle is designated to increase in the counterclockwise direction with a downward direction of the drawing sheet as 0 degree.

As shown in FIG. 4, when polarized light is incident on the conventional light distribution control element, there emerges a variation in the brightness substantially in the concentric shape centering on two points in the vicinity of an emitting angle of 40 degree. This can be visually recognized actually as a fringe pattern when observed in an oblique direction.

According to the conventional light distribution control element used in the measurement, there is used a flat polyethylene terephthalate (PET) film having a thickness of 120 μm as the transparent base member 101. There are formed 5 μm of a transparent adhering agent layer comprising a polyester-based hot melt adhering agent and 4.5 μm of a colored adhering agent layer in which 10 parts by weight of carbon black is blended to a polyester-based hot melt adhering agent on the transparent adhering agent layer and transparent spherical glass beads each having a refractive index of 1.935 (wavelength: 589.3 nm) and a diameter of 50 μm are densely arranged to disperse on the colored adhering agent layer and embedded in and fixedly attached to the adhering agent layers.

A thickness of the adhering layer after fixedly attached with the transparent beads is about 21 μm including those of the transparent layer and the colored layer and about 58% of the diameter of the transparent beads is exposed from the adhering agent layer.

In this case, there is used a PET film which is biaxially elongated as the transparent base member 101 in the above-described light distribution control element. This is because according to the biaxially elongated film, in comparison with a non-elongated film, physical properties are significantly promoted such that tensile strength and impact strength are increased and transparency and a range of temperature of use are also improved. Further, the PET film is provided with excellent adherence with a polyester-based hot melt adhering agent having excellent adhering performance with transparent glass beads and is provided with excellent solvent resistance against the above-described hot melt adhering agent (solvent: toluene).

Although the biaxially-elongated PET film is used for the transparent base member from the above-described reason, generally, a biaxially-elongated film comprises a substance having biaxial anisotropy in which three main refractive indices (direction orthogonal to film face: Z-axial direction, directions in parallel with film face and orthogonal with each other: X-axis and Y-axial directions) differ from each other.

Figure 6:
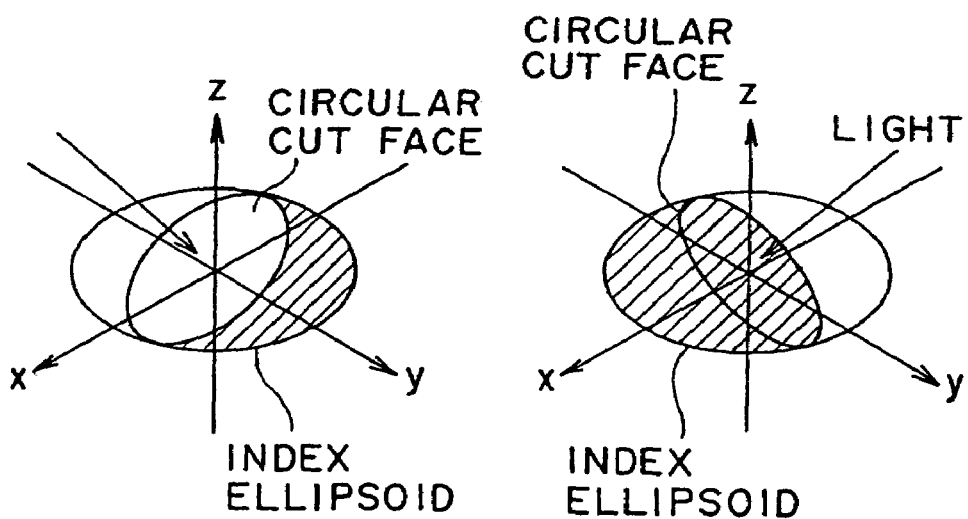
FIG. 6 is an explanatory view of a circular cut surface of an index ellipsoid.

The bilateral anisotropy is a property of a substance in which considering an index ellipsoid as shown in FIG. 6, a shape of a cut face thereof is circular, and there are determined two directions of directions producing no refractive index anisotropy.

Figure 7:
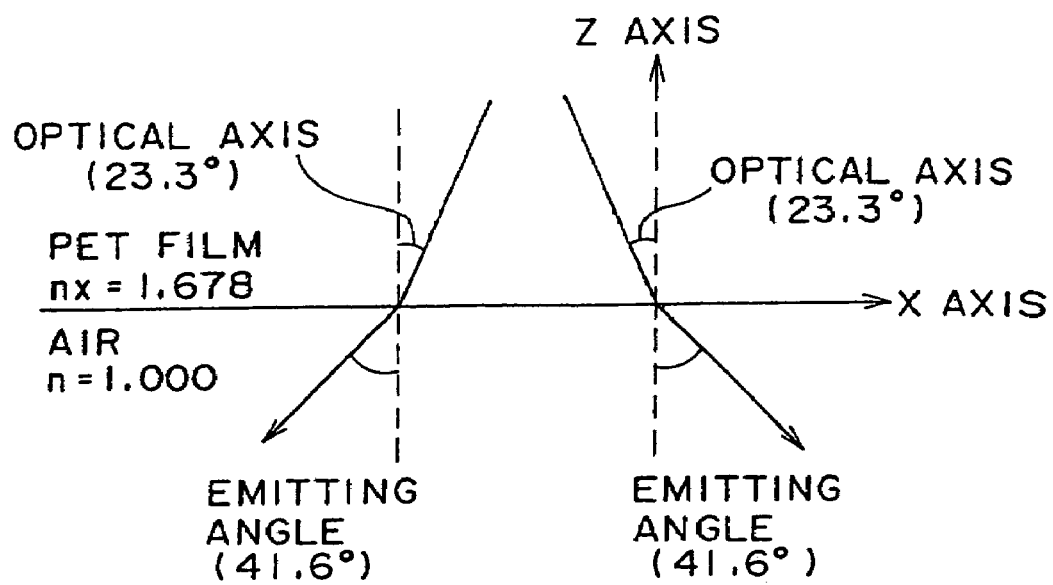
FIG. 7 is an explanatory view of an optical axis of a polyethylene terephthalate film.

The direction of light is referred to as an optical axis. Since there is no anisotropy of refractive index at the optical axis, there is caused no phase difference in polarized light progressing in parallel therewith. For example, in the case of the PET film used in the above-described conventional example, three main refractive indices are $n_x=1.678$, ny=1.645, nz=1.497. As shown in FIG. 7, there are two of optical axes in ZX plane forming an angle of 23.3 degree with respect to Z-axis.

Light progressing along the optical axes in the PET film is refracted at an interface with air and is emitted at an emitting angle of 41.6 degree, and therefore, substantially the central positions of the variation of the brightness in the vicinity of the emitting angle 40 degree shown in FIG. 4 correspond to the optical axes.

Now, consider the case where light in a particular polarized state (linearly polarized light or elliptically polarized light) is incident on the light distribution control element. In this case, most of light incident on the light distribution control element is converged by the transparent beads, thereafter, is diverged and progresses in the PET film at various angles. At this occasion, light progressing along the optical axes in the PET film does not cause phase differences and the polarized state remains unchanged.

However, light progressing at an angle deviated from the optical axes causes phase differences in correspondence with the deviation of the angle, and accordingly, a polarized state, that is, a rate of a p polarized light component in parallel with the light incident face and s polarized light component orthogonal thereto, is changed at the interface on the light emitting side of the PET film. That is, according to the light progressing in a direction different from directions of the optical axes, in correspondence with the magnitude of the deviation from the optical axes, light having much of the p polarized light component and light having much of the s polarized light component emerge alternately.

Figure 8:
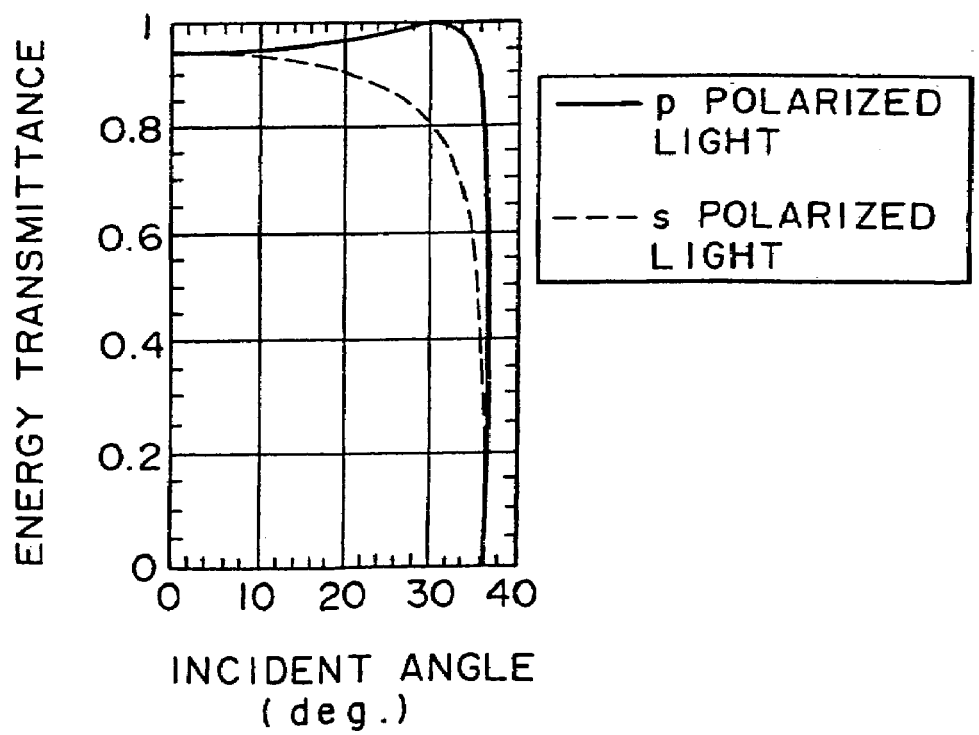
FIG. 8 is a graph showing a relationship between an optical incident angle and an energy transmission rate of the polyethylene terephthalate film.

In this case, generally, in refraction at a surface of a dielectric body, there is produced a difference in energy transmittance between p polarized light and s polarized light. FIG. 8 exemplifies the difference in the energy transmittance between p polarized light and s polarized light and is a graph showing a relationship between the light incident angle and the energy transmittance when light progresses from the PET film into air.

As shown in FIG. 8, a maximum of 30% or higher of the difference in the transmittance is produced between p polarized light and s polarized light.

Accordingly, there is produced a difference in a transmitted light amount between lights having much of the p polarized light component and the s polarized light component and bright and dark in the brightness is provided, which is visually recognized as the fringe pattern.

Particularly, in a light distribution control element using micro-lenses represented by transparent beads, light incident on the micro-lens is converged and progresses in a transparent base member at various angles while being diverged, and accordingly, non-uniformity (variation) in the brightness of the emitting light is produced very easily by a difference in the phase difference based on a difference in progressing angle of light in the transparent base member.

The light distribution control element according to the present invention is featured in using the transparent base member 101 which is substantially isotropic optically or which is provided with a substance with uniaxial anisotropy having an optical axis in parallel with the film face. Accordingly, although polarized light incident on the light distribution control element is converged by the transparent bead and progresses at various angles in the transparent base member while being diverged, since the transparent base member is optically isotropic, there produces no variation in phase difference owing to the progressing angle, that is, the rate between the p polarized light component and the s polarized light component hardly changes also by the emitting angle, and accordingly, the fringe pattern is not produced.

Further, when polarized light incident on the light distribution control element is linearly polarized light, when the transparent base member is of a substance with uniaxial anisotropy having the optical axis in the face, by making a direction of oscillation of an electric vector of the incident linearly polarized light direct in parallel with or orthogonal to a retarded phase axis of the transparent base member, a variation in phase difference produced by the progressing angle of the polarized light transmitting through the transparent base member can be reduced and occurrence of the fringe pattern can be restrained.

Further, even when the transparent base member is provided with optical anisotropy, in the case where the variation in phase difference produced by the progressing angle of light progressing in the transparent base member is small and a variation in polarized state is small, the variation in brightness is not visually recognized and is permitted.

For example, when a maximum value of the variation in phase difference produced by the difference in progressing angle of light progressing in the transparent base member is equal to or smaller than a half wavelength, according to the variation in polarized state produced by the angle of light transmitting through the transparent base member, even at its maximum, only light having 100% of p polarized state component is converted into light having 100% of s polarized light component, and accordingly, the change in the brightness is difficult to recognize visually.

More ideally, it is preferable to restrain the maximum value of the variation in phase difference produced by the angle of light transmitting through the transmitting base member is restrained to be equal to or smaller than a quarter wavelength. In this case, even at maximum, for example, light having 100% of the p polarized light component is only converted into light having 50% of the p polarized light component and 50% of the s polarized light component, and accordingly, the change in brightness is further difficult to be recognized.

Therefore, the transparent member which is substantially isotropic optically shows here a member exhibiting isotropy to a degree in which the variation in phase difference produced by the difference in progressing angle of light progressing in the transparent base member is small, and accordingly, the change in polarized state is also small and the change in the brightness cannot be recognized.

As described above, according to the light distribution control element of the present invention, there is used a transparent body which is substantially isotropic optically or which is provided with the uniaxial anisotropy having the optical axis in the face as the transparent base member, and accordingly, even when polarized light is incident thereon, no deterioration in the image quality is caused by occurrence of the fringe pattern and a wide viewing angle is provided.

Further, the unnecessary light 107 incident from outside on the light distribution control element 100 is absorbed by the colored adhering agent layer 102, and accordingly, the unnecessary light becomes stray light and is not observed. Therefore, stray light derived from outside unnecessary light is reduced even under a bright environment.

Further, as described above, the energy transmittance of the surface of the dielectric body differs between p polarized light and s polarized light, and therefore, the transmittance of the p polarized light component is high and the transmittance of light of the s polarized light component is low at the surface of the transparent base member 101. As a result, there is produced anisotropy in the light distribution characteristics of the emitting light in accordance with the polarized state of the incident light.

For example, when linearly polarized light is incident on the light distribution control element, a viewing angle in a direction in parallel with the oscillation direction of the electric vector of the linearly polarized light is wider than that in a direction orthogonal thereto. By utilizing the characteristics, a viewing angle in the horizontal direction can be made larger than a viewing angle in the vertical direction by making linearly polarized light having the oscillation direction of the electric vector in the horizontal direction incident on the light distribution control element.

To the contrary, by making the oscillation direction of the electric vector of incident linearly polarized light vertical, the viewing angle in the vertical direction can be made larger than the viewing angle in the horizontal direction. Further, by constituting light incident on the polarized light control element of circularly polarized light, an isotropic viewing angle can also be provided.

That is, according to the light distribution control element of the present invention, by controlling the polarized state of light to be incident thereon, the viewing angle can be arbitrarily controlled.

Further, the explanation heretofore has been given of the case of using the transparent beads each in a very small spherical shape as a micro-lens. However, the shape of the very small condensing lens is not limited to that of spherical bodies such as a hemisphere, an ellipsoid of revolution, a circular cylinder, a semicircular cylinder, and an elliptic cylinder so far as the condensing lens is a very small body having condensing action. That is, the light distribution control element according to the present invention is constituted of micro-lenses having condensing action and a transparent base member supporting the micro-lenses, and the transparent base member arranged on the light emitting side is constituted of a transparent body which is substantially isotropic optically to thereby prevent light progressing in the transparent base member at angles different from producing various phase differences and eliminates occurrence of the fringe pattern (non-uniformity in brightness).

Next, an explanation will be given of a light distribution control element according to the present invention in reference to specific embodiments.

[Embodiment 1 of Light Distribution Control Element]

In the present embodiment, the light distribution control element shown in FIG. 1 and FIG. 2 is fabricated as follows. First, one surface of a transparent base member 101 comprising a flat triacetylcellulose (TAC) film having a thickness of 80 µm is coated with a polyester-based hot melt transparent adhering agent (manufactured by Toyo Boseki) using toluene as a solvent by a knife coater such that a thickness after drying becomes 4 µm, followed by drying in a desiccator and cooling, to thereby form and solidify a transparent adhering agent layer 102.

Next, a colored adhering agent produced by blending the polyester-based hot melt adhering agent with 10 parts by weight of carbon black is formed and solidified by a method similar to that of the adhering agent layer 102 such that a thickness after drying becomes 5.5 µm, thereby forming a colored adhering agent layer 103.

Next, a plurality of spherical transparent beads 105 made of glass having a refractive index of 1.935 (wavelength: 589.3 nm) and a diameter of 50 µm are arranged to disperse on the colored adhering agent layer 103 such that a substantially maximum packing density is achieved, and held in a thermostatic chamber at 120° C. for 20 minutes while pressing the beads toward the transparent base member 101 under pressure of 4.5 kg/cm$^2$ by using a pressing plate. Thereafter, by cooling the resultant layer to normal temperature, the transparent adhering agent layer 102 and the colored adhering agent layer 103 are solidified and the transparent beads 105 are fixed. The thickness of the hot melt adhering agent layer 104 after fixing the transparent beads is about 21 µm and 58% of the diameter of the transparent beads 105 is exposed.

Further, the TAC film used for the transparent base member 101 is a transparent film which is substantially isotropic optically such that (ne-no)=0.0001, (nz-no) =0.0007.

When unpolarized light is made incident on the above-described light distribution control element to thereby evaluate the element, there is provided an isotropic and wide viewing angle (in this case, an angle at which brightness becomes a half of brightness in a forward direction) of about 60 degree both in the horizontal direction and the vertical direction.

Further, when linearly polarized light is made to be incident thereon, non-uniformity of brightness causing a fringe pattern is not recognized and there is provided bright and wide viewing angle characteristics even viewed at any angle by an observer.

Figure 9:
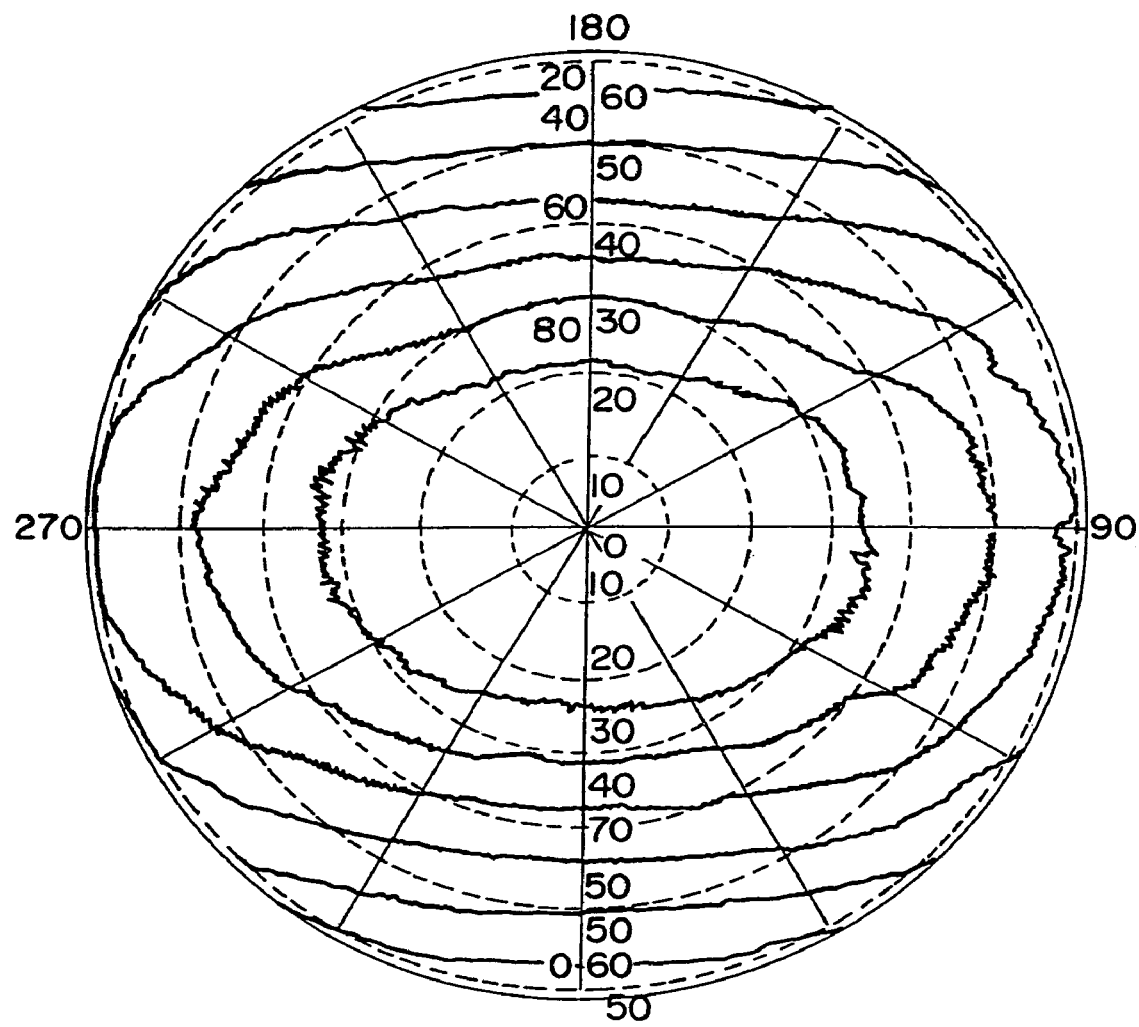
FIG. 9 is an equi-brightness diagram showing light emitting characteristics of a light distribution control element according to the present invention when linearly polarized light is incident thereon.
Figure 9:
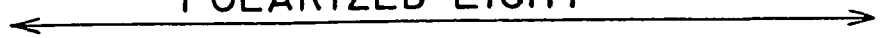
Figure 10:
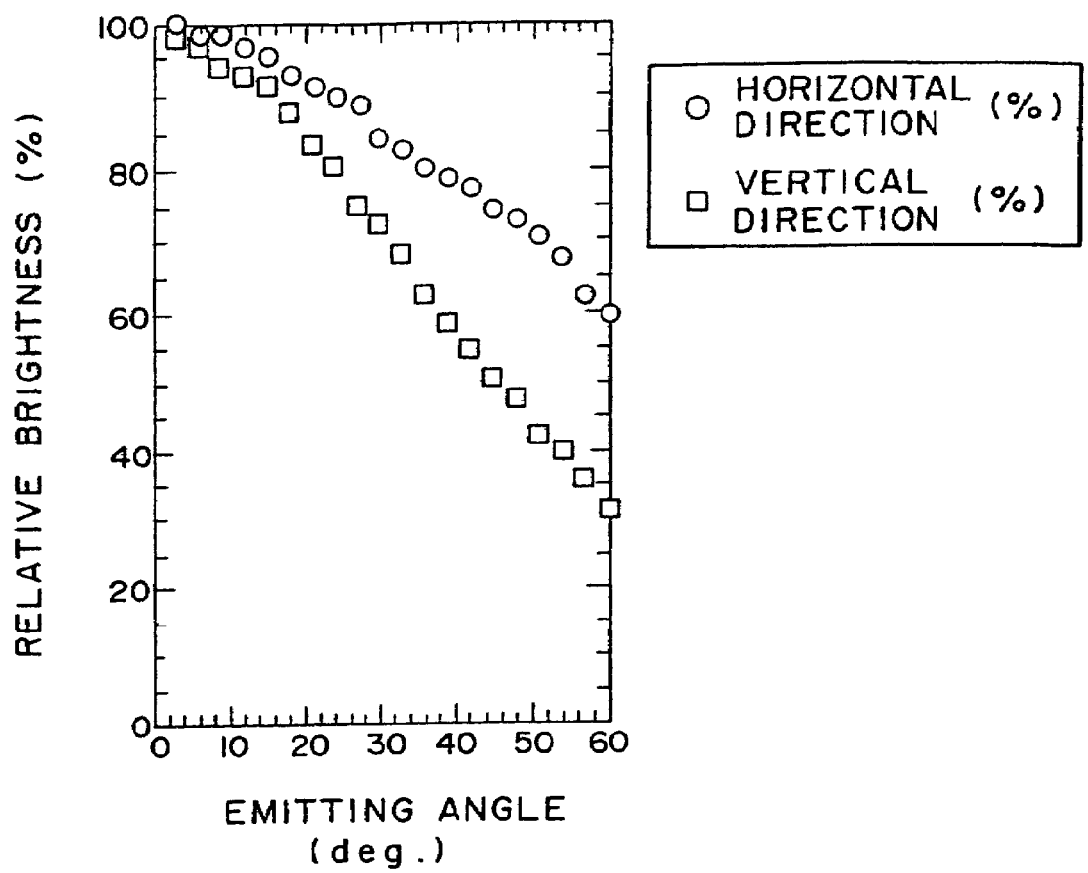
FIG. 10 is a graph showing light emitting (distributing) characteristics of the light distribution control element according to the present invention when linearly polarized light is incident thereon.

FIG. 9 is an equi-brightness diagram showing light emitting characteristics of the light distribution control element in the embodiment when linearly polarized light is made incident thereon, and FIG. 10 shows light emitting (light distributing) characteristics in the horizontal direction and the vertical direction of the light distribution control element in the embodiment when linearly polarized light is made incident thereon.

As shown in FIG. 9 and FIG. 10, the light distribution control element in the embodiment is provided with polarized light dependency in the light emitting (light distributing) characteristics and a viewing angle (±75 degree) in a direction in parallel with the oscillation direction of the electric vector of incident linearly polarized light (horizontal direction in the drawing) becomes wider than a viewing angle (±45 degree) in a direction orthogonal thereto. This is because of the following reason.

According to the light distribution control element, most of polarized light incident on the transparent beads 105 is condensed while substantially maintaining the polarized state, is diverged, progresses in the transparent base member 101 at various angles, and is emitted. At this occasion, the transparent bead 105 is a spherical body, and accordingly, the angle of refraction becomes isotropic regardless of polarized light. However, the energy transmittance differs between p polarized light and s polarized light on the surface of the transparent bead 105 and on the light emitting side surface of the transparent base member 101, and therefore, in respect of the surface of the transparent bead 105 or the transparent base member 101, the transmittance of the p polarized light component becomes high, the transmittance of the s polarized light component becomes low, and as a result, the polarized light dependency is produced in the light distribution characteristics.

Accordingly, when circularly polarized light is made incident on the light distribution control element, an isotropic viewing angle is formed similarly to the case where unpolarized light is made incident thereon. That is, as in the light distribution control element, when as a micro-lens, there is used a revolutionarily symmetric micro-lens as in the spherical transparent bead, the light distribution characteristics can be changed comparatively easily in the state of polarizing incident light.

Further, when a light distribution control element is fabricated with a constitution similar to that of the above-described embodiment except that transparent beads having a refractive index of 1.7 are used and its characteristics are investigated by making unpolarized light incident thereon, brightness in a forward direction becomes 1.8 times as much as that of the above-described embodiment and the viewing angle becomes ±37. That is, according to the light distribution control element, the gain and viewing angle can be changed by changing the refractive index of transparent beads. That is, by pertinently selecting the refractive index of the transparent beads, there can be realized a light distribution control element having desired characteristics.

[Embodiment 2 of Light Distribution Control Element]

In the present embodiment, the light distribution control element shown in FIG. 1 and FIG. 2 are fabricated as follows.

A surface of a transparent base member 101 comprising a flat polycarbonate (PC) film having a thickness of 100 µm formed by a casting process (a solution flowing and expanding process) is coated with a polyester-based hot melt transparent adhering agent dispersed in an aqueous medium by a knife coater such that a thickness after drying becomes 4 µm, is heated and dried, and thereafter, is cooled, to thereby form and solidify a transparent adhering agent layer 102.

Next, a colored adhering agent layer 103 in which 10 parts by weight of carbon black is blended to the polyester-based hot melt adhering agent is formed and solidified thereon similarly to the above-described manner such that the thickness after drying becomes 5.5 µm.

Next, on top thereof, spherical transparent beads 105 made of glass having a refractive index of 1.935 (wavelength: 589.3 nm) and a diameter of 50 µm are embedded and fixed into a hot melt adhering agent layer 104 similarly to Embodiment 1. The thickness of the hot melt adhering agent layer 104 after being fixed is about 21 µm and 58% of the diameter of the transparent beads 105 is exposed. Further, the PC film used for the transparent base member 101 is a transparent film which is substantially isotropic optically of (ne-no)≦0.0001. When circularly polarized light is made incident on the light distribution control element and the element is evaluated, there is no non-uniformity in brightness causing a fringe pattern, and an isotropic and wide viewing angle of about 60° is achieved. Further, when linearly polarized light is made incident thereon, there is no non-uniformity of brightness causing a fringe pattern, and there are provided light emitting characteristics in which the viewing angle in a direction in parallel with the oscillation direction of the electric vector of the incident linearly polarized light is wider than the viewing angle in a direction orthogonal thereto.

[Embodiment 3 of Light Distribution Control Element]

In the present embodiment, the light distribution control element shown in FIG. 1 and FIG. 2 is fabricated as follows.

A surface of a transparent base member 101 comprising a uniaxially elongated flat PC film having a thickness of 100 µm which is formed by an extrusion process (a molten extrusion process) is coated with a polyester-based hot melt transparent adhering agent dispersed in an aqueous medium by a knife coater such that a thickness after drying becomes 4 µm, and is dried and cooled, to thereby form and solidify a transparent adhering agent layer 102.

Next, a colored adhering agent layer 103 is formed and solidified similarly to Embodiments 1 and 2, transparent beads 105 are arranged to disperse thereon, and thereafter, the transparent beads are held at 120° C. for 30 minutes while being pressed, and are embedded and fixed into a hot melt adhering agent layer 104. The thickness of the hot melt adhering agent layer 104 after being fixed is about 21 µm, and 58% of the diameter of the transparent beads 105 is exposed.

Further, the PC film used for the transparent base material 101 is a transparent film with uniaxial anisotropy having an optical axis in a direction in parallel with the film face of (ne-no)=0.0014.

When linearly polarized light in which the oscillation direction of the electric vector is parallel with or orthogonal to a retarded phase axis of the transparent base member 101 is made incident on the light distribution control element, there is no non-uniformity of brightness causing a fringe pattern and there is provided light emitting characteristics in which the viewing angle in a direction in parallel with the oscillation direction of the electric vector of incident linearly polarized light is wider than a viewing angle in a direction orthogonal thereto.

Further, according to the light distribution control element, physical properties such as tensile strength and initial elastic modulus are improved by uniaxially elongating the transparent base member, and there can be provided the sheet-like light distribution control element having less curling or the like.

[Embodiment 4 of Light Distribution Control Element]

In the present embodiment, the light distribution control element shown in FIG. 1 and FIG. 2 is fabricated as follows.

A surface of a flat transparent base member 101 composed of an alicyclic acrylic resin (trade name "Optlet," manufactured by Hitachi Kasei Kogyo) having a thickness of 2 mm formed by injection molding is coated with an acrylic-based hot melt transparent adhering agent by a spin coater such that the thickness after drying becomes 4 µm, and is dried and thereafter cooled, to thereby form and solidify a transparent adhering agent layer 102.

Next, a colored adhering agent layer 103 in which 10 parts by weight of carbon black is blended similarly to the acrylic-based hot melt adhering agent is formed and solidified by a method similar to that of the transparent adhering agent layer 102 such that the thickness after drying the adhering agent becomes 5.5 µm.

Spherical transparent beads 105 made of glass having a refractive index of 1.935 (wavelength: 589.3 nm) and a diameter of 50 µm are arranged to disperse thereon, the beads are held at 120° C. for 20 minutes while being pressed similarly to the above-described embodiments, and embedded and fixed into the hot melt adhering agent layer 104. The thickness of the hot melt adhering agent layer 104 after being fixed is about 21 µm and 58% of the diameter of the transparent beads 105 is exposed.

Further, the alicyclic acrylic resin used for the transparent base member 101 is substantially isotropic optically such that (ne-no)=0.0007.

When circularly polarized light is made incident on the light distribution control element and the element is evaluated, there is no non-uniformity of brightness causing a fringe pattern and an isotropic and wide viewing angle of about 50 degree is provided. Further, when linearly polarized light is made incident thereon, there is no non-uniformity of brightness causing a fringe pattern, and there is provided light emitting characteristics in which the viewing angle in a direction in parallel with the oscillation direction of the electric vector of the incident linearly polarized light is wider than a viewing angle in a direction orthogonal thereto.

Further, according to the light distribution control element of the embodiment, there is a rigidity in the transparent base member 101 per se, and accordingly, the element can be used as a screen of a rear projection type display apparatus even without reinforcement members or the like.

Figure 34:
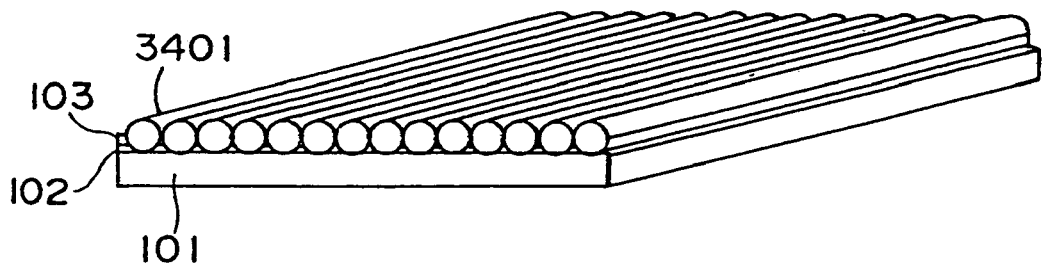
FIG. 34 is a schematic sectional view of a light distribution control element according to the present invention.

Although according to the above-described embodiments, the spherical transparent bead is used as the micro-lens, micro-lenses having other shapes may be used. FIG. 34 is a schematic perspective view showing an example of micro-lenses having other shapes. The constitution is similar to those in the above-described embodiments except that a columnar micro-transparent rod 3401 is used.

According to the light distribution control element, in respect of incident light, the converging effect is produced not in a long axial direction of the micro-transparent rod 3401 but only in the direction orthogonal to the long axial direction, and the wide viewing angle is formed only in such a direction. Also in this case, occurrence of a fringe pattern at the time of incidence of polarized light can be avoided by using the transparent base member having small optical anisotropy.

Further, when light incident on the light distribution control element is linearly polarized light, when an oscillation direction of the polarized light is made in parallel with the long axial direction of the micro-transparent rod, the polarized light becomes p polarized light in respect of an incident face of the micro-transparent rod, and accordingly, the light distribution control element can be used with high transmittance.

Figure 35:
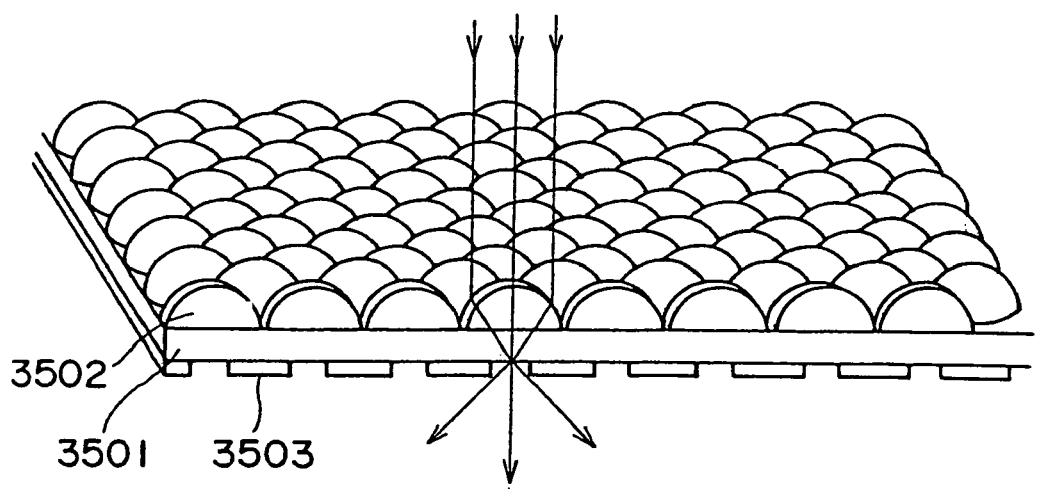
FIG. 35 is a schematic perspective view of a light distribution control element according to the present invention.
Figure 36:
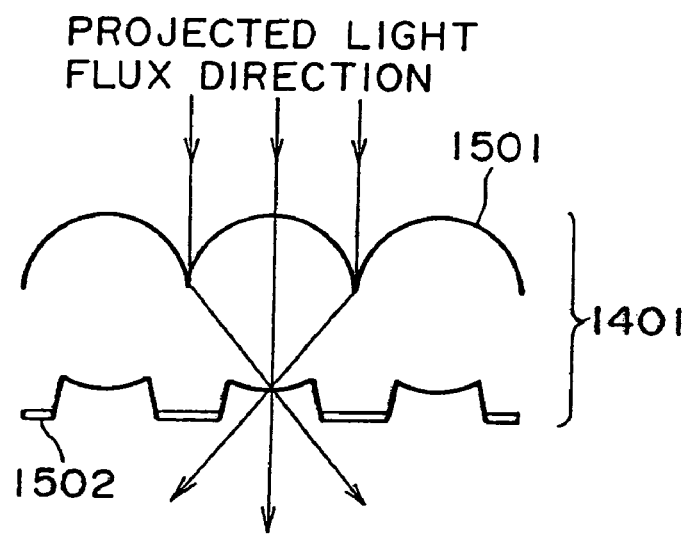
FIG. 36 is a schematic sectional view showing an example of a lenticular lens sheet.
Figure 37:
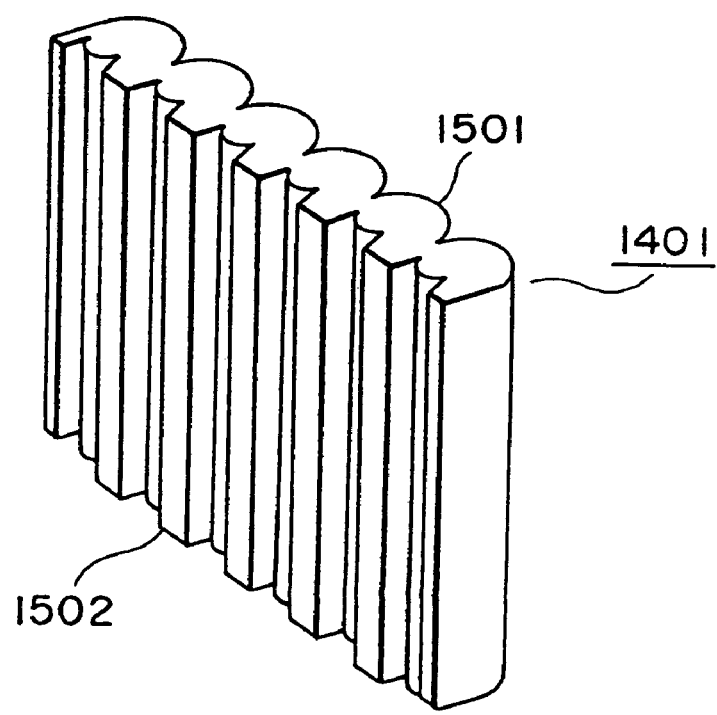
FIG. 37 is a schematic perspective view showing the example of the lenticular lens sheet.
Figure 38:
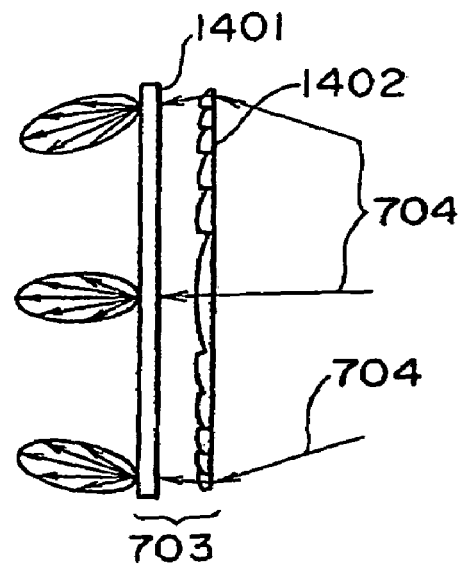
FIG. 38 is a schematic sectional view showing an example of a conventional transmission type screen.
Figure 39:
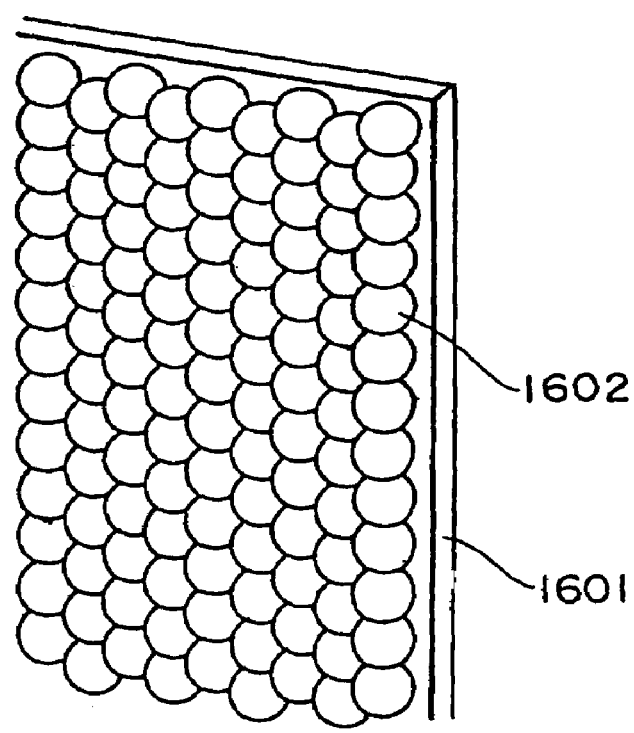
FIG. 39 is a perspective view of a conventional transmission type screen.

In the meantime, although according to the above-described respective embodiments, the micro-lens is constituted of a previously formed very small body such as a transparent bead or rod, the light distribution control element according to the present invention is not limited thereto. That is, a number of micro-lenses may be formed in a two-dimensional array directly on the transparent base member. FIG. 35 is a schematic perspective view showing an example of such a light distribution control element.

According to the light distribution control element, micro-lenses 3502 are molded in a two-dimensional array on a transparent base member 3501 which is substantially isotropic optically such as glass, a non-elongated PC film, a TAC film or an injection-molded acrylic resin plate and a light absorbing layer (black matrix) 3503 in black color having opening portions are formed at light converging portions of the micro-lenses 3502.

The light absorbing layer 3503 can be formed by well-known technology, for example, a printing process, a vapor deposition process, a photolithography process or the like. Further, the micro-lens 3502 can be formed by well-known technology, for example, a method in which a positive type photoresist is exposed by a pattern and developed to thereby provide a stereoscopic columnar shape, and thereafter, a dome-like micro-lens is formed by surface tension in heating and melting; or a method in which a transparent resin film cured by being irradiated with a light ray or an electron beam is formed on the transparent base member 3501 and the resin film is selectively irradiated with the light ray or the electron beam to thereby cure the film and uncured portion is removed.

In any cases, by using a transparent member which is substantially isotropic optically or a transparent member having uniaxial optical anisotropy for the transparent base member 3501, there can be resolved the problem of occurrence of a fringe pattern at the time of the incidence of polarized light.

[Embodiment 1 of Rear Projection Type Display Apparatus]

Figure 11:
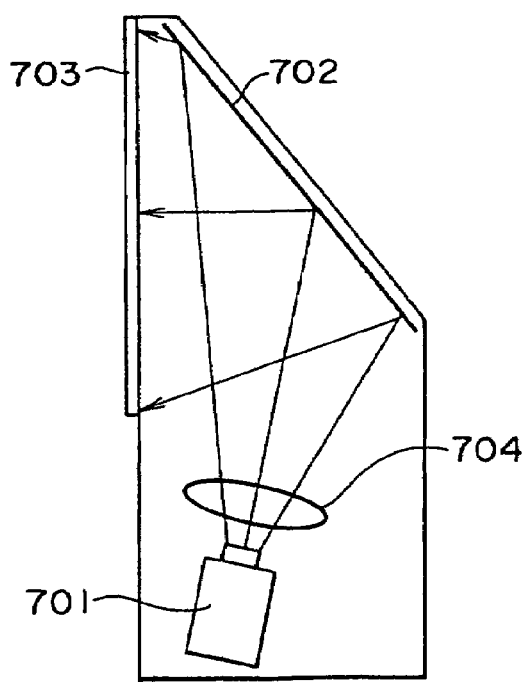
FIG. 11 is a schematic sectional view of a rear projection type display apparatus according to the present invention.

Next, an explanation will be given of a rear projection type display apparatus using the light distribution control element according to the present invention. FIG. 11 is a schematic sectional view of the rear projection type display apparatus.

According to the projection type display apparatus of the present invention, as shown in FIG. 11, a transmission type screen 703 is irradiated with a projected light beam 704 from a projecting apparatus 701 via a mirror 702. As the mirror 702, there is used optically isotropic, transparent glass vapor-deposited with a reflective metal of silver, aluminum or the like.

As the projecting apparatus 701, a so-called liquid crystal projector can be used.

Figure 12:
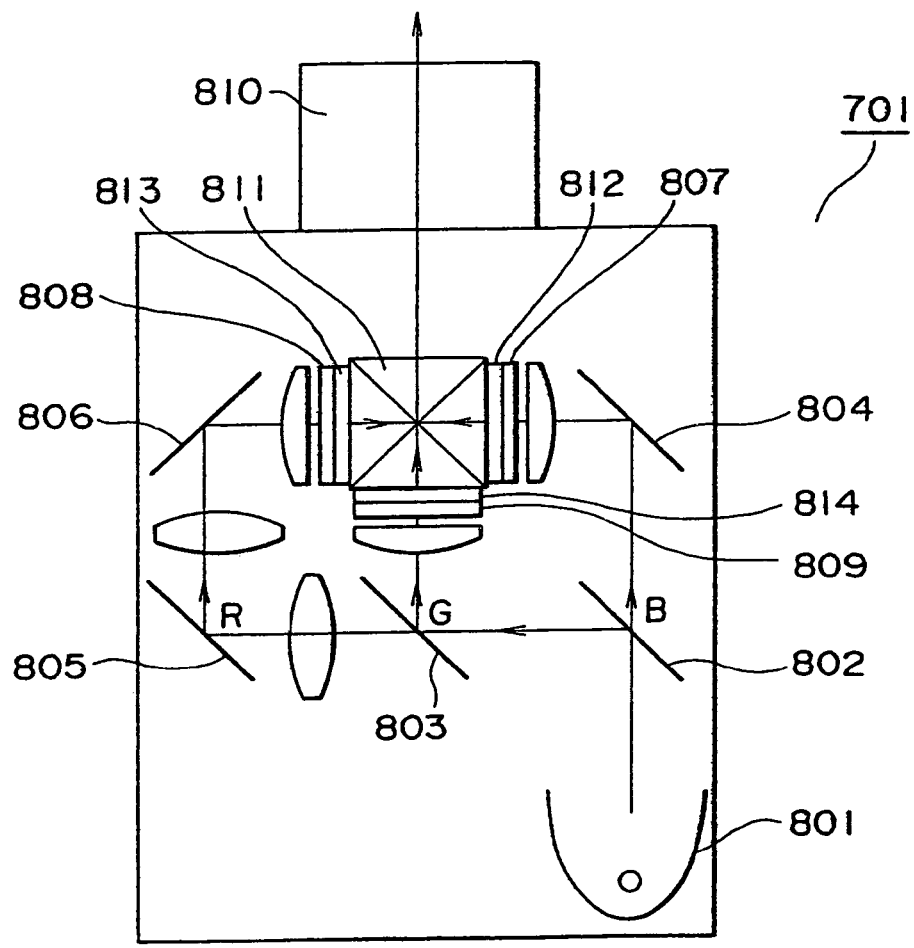
FIG. 12 is a schematic sectional view of a projecting apparatus according to a rear projection type display apparatus of the present invention.

FIG. 12 is a schematic sectional view showing an example of the liquid crystal projector.

A light source 801 is constituted of a reflector having hyperboloid of revolution or ellipsoid of revolution and a white color light source of a Xenon lamp, a metal halide lamp, a halogen lamp or the like, and light emitted therefrom transmits through an UV and IR cut filter (not illustrated) or the like, to thereby constitute white color light without any ultraviolet ray or infrared ray, and progresses toward a color separating dichroic mirror 802.

The white color light incident on the color separating dichroic mirror 802 is separated into blue color light (B) and other light, and the blue light (B) is reflected by a total reflection mirror 804 and reaches a liquid crystal display element 807.

In the meantime, green color light (G) and red color light (R) reflected by the color separating dichroic mirror 802 are separated by a color separating dichroic mirror 803, the green color light (G) progresses toward a liquid crystal display element 809. Further, the red color light (R) is reflected by total reflection mirrors 805 and 806 and reaches a liquid crystal element 808. TN liquid crystal display elements can be used for the liquid crystal display elements 807, 808 and 809.

Figure 13:
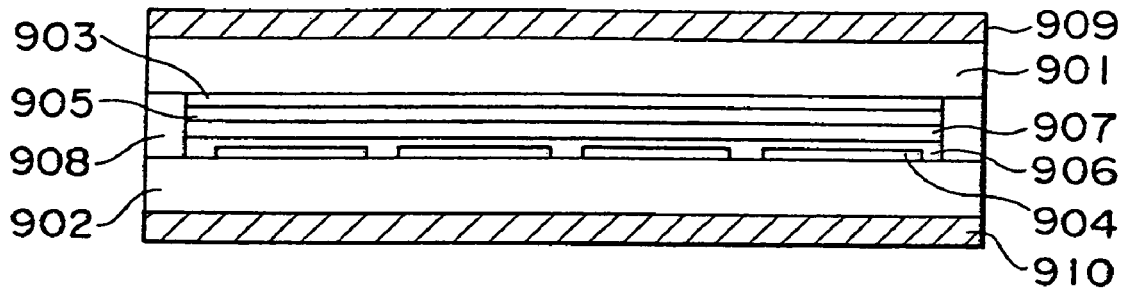
FIG. 13 is a schematic sectional view of a two-dimensional optical switch of the projecting apparatus according to the rear projection type display apparatus of the present invention.

FIG. 13 is a schematic sectional view showing an example of a TN liquid crystal display element. The liquid crystal display element includes a transparent electrode 903 comprising ITO (Indium Tin Oxide), a first transparent glass substrate 901 having an orientation film 905 composed of a polyimide-based polymer, an orientation film 906, a transparent electrode 904 forming pixels, a second transparent glass substrate 902 connected thereto and having wirings, not illustrated, switching elements of thin film transistors or the like and a liquid crystal layer 907 comprising nematic liquid crystals having positive dielectric anisotropy which are enclosed between two sheets of the transparent glass substrates 901 and 902 adhering to each other via a sealing agent 908.

The long axial direction of liquid crystal molecules of the liquid crystal layer 907 is twisted continuously by 90 degree between the transparent glass substrates by rectifying the orientation direction by subjecting orientation films 905 and 906 formed on two sheets of transparent glass substrates 901 and 902 to a rubbing process.

A light incident face and a light emitting face of the liquid crystal display element are respectively provided with a polarizer 909 and an analyzer 910 to transmit two pieces of linearly polarized light orthogonal to each other and orientation directions of the long axes of the liquid crystal molecules of the liquid crystal layer 907 at the transparent glass substrates 901 and 902 are respectively constituted to be parallel with or orthogonal to the transmission axes of the linearly polarized light at the polarizer 909 and the analyzer 910.

There are used the polarizer 909 and the analyzer 910 having a constitution in which triacetylcellulose (TAC) protective layers are provided on both faces of a film provided with a light polarizing function by making elongated polyvinyl alcohol (PVA) absorb iodine and the polarizer and the analyzer are optically coupled to the transparent glass substrate 901 and the transparent glass substrate 902 by an acrylic-based adhering agent.

An explanation will be given here of operation of the liquid crystal display element. Linearly polarized light incident on the liquid crystal display element and transmitted through the polarizer 909, transmits through the liquid crystal layer 907 and is incident on the analyzer 910. At this occasion, the polarized state of light transmitting through the liquid crystal layer 907 is changed by an electric field applied to the liquid crystal layer 907, and accordingly, a voltage corresponding to image information is applied to the transparent electrode 905 and the transparent electrode 904, and the electric field is applied to the liquid crystal layer 907 to thereby achieve the formation of an optical image by controlling an amount of light transmitting through the analyzer 910.

Therefore, the lights of colors respectively incident on liquid crystal display elements 807, 808 and 809 in FIG. 12, are spatially modulated and emitted in accordance with respective image information. The lights of colors modulated respectively by the liquid crystal display elements transmit through polarized state aligning means 812, 813 and 814, described later in details, are incident on a color synthesizing cross dichroic prism 811 and synthesized, and thereafter projected to the transmission type screen 703 via a projecting lens 810.

Figure 14:
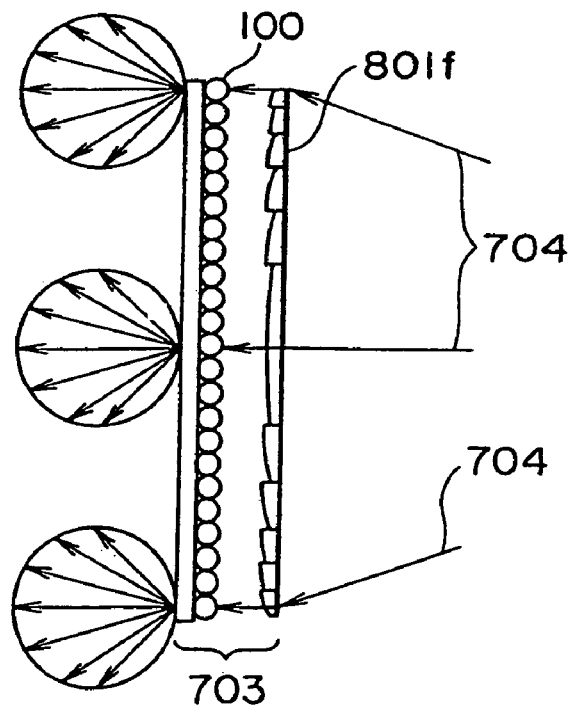
FIG. 14 is a schematic sectional view of a transmission type screen according to the rear projection type display apparatus of the present invention.

FIG. 14 is a schematic sectional view of the transmission type screen 703 of the rear projection type display apparatus according to the present invention.

The transmission type screen 703 is constituted of a Fresnel lens sheet 801f and the light distribution control element 100 according to the present invention. The Fresnel lens 801f is an optical part operating similarly to a convex lens and operates to collimate diverging projected light beam emitted from the projecting apparatus 701 and convert an angle of incidence of light incident on the light distribution control element 100 to 0 degree or its approximation.

Figure 15:
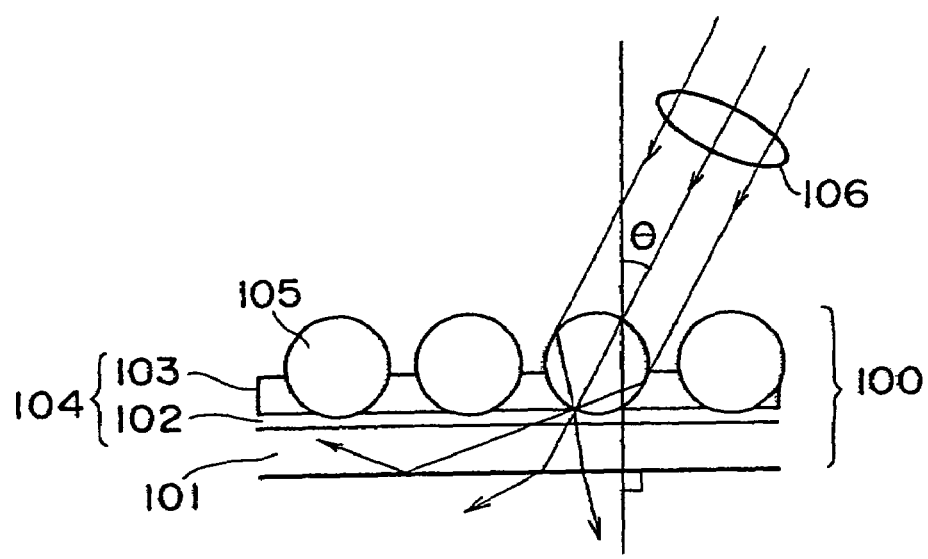
FIG. 15 is a schematic diagram for explaining a dependency of a transmission rate on an optical incident angle according to the light distribution control element of the present invention.

Here, the light distribution control element 100 according to the present invention is provided with a property in which when the angle of incidence is increased, the transmittance is reduced in view of the constitution. FIG. 15 is a schematic view for explaining a reduction in the transmittance based on an increase in angle of incidence.

When the angle θ of incidence of light is increased, the incident light 106 is converged by the transparent bead 105 and is emitted from the transparent base member 101 while being diverged and in such a case, the angle of incidence on the interface between the transparent base member 101 and air is increased, and accordingly, reflection is increased and the transmittance is significantly reduced. Further, when the angle θ of incidence is further increased, light which is incident on and converged to the transparent bead 105 cannot transmit through an opening portion of the light distribution control element 100, that is, a portion thereof where the transparent bead 105 is brought into contact with the transparent adhering agent layer 102 and is absorbed by the colored adhering agent layer 103 to thereby reduce the transmittance.

Figure 16:
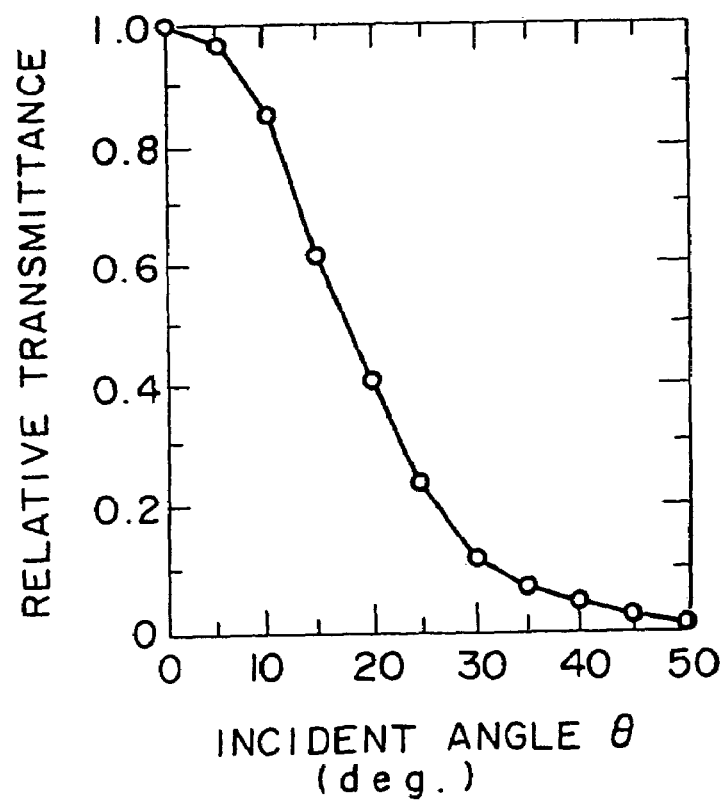
FIG. 16 is a graph showing one example of a relationship between a transmission rate and the optical incident angle according to the light distribution control element of the present invention.

FIG. 16 is a graph showing an example of a relationship between the angle of incidence and the transmittance of light of the light distribution control element 100. The abscissa designates the angle θ of incidence of light and the ordinate designates relative transmittance assuming that the transmittance is 1 when the angle θ of incidence is 0.

When the angle θ of incidence exceeds 10 degree, the transmittance is rapidly reduced. Accordingly, it is preferable that the divergence of light incident on the light distribution control element 100 should be smaller, the better and it is practically preferable to set the angle of incidence within 10 degree at a half value angle.

Accordingly, when the light distribution control element is used in a transmission type screen of a rear projection type display apparatus using a conventional 3-tube type projecting apparatus using three CRT projection tubes corresponding to, for example, three primary colors of R, G and B, the angles of incidence of respective color lights incident on the color distribution control element differ from each other, and accordingly, there poses a problem that transmittances of respective color lights differ from each other, white balance is deteriorated or strong color shift emerges.

Therefore, the rear projection type display apparatus according to the present invention is featured in using a projecting apparatus of a single tube type as a projecting apparatus. In the case of the single tube type, angles of incidence of respective color lights on a transmission type screen coincide with each other, and accordingly, no deterioration occurs in the white balance or emergence of the color shift.

Further, the Fresnel lens 801f is arranged on the light incident side of the light distribution control element 100 constituting the transmission type screen 703, the diverging projected light beam 704 from the projecting apparatus 701 is collimated and the angle of incidence of light incident on the light distribution control element 100 is converted substantially into 0 degree, to thereby restrain the transmittance of the color distribution control element 100 from reducing and promote the brightness of a displayed image.

In this case, according to the TN liquid crystal display element used as a two-dimensional switch element of the projecting apparatus 701, generally, in order to ensure symmetry of the contrast ratio in the horizontal direction, the element is arranged such that the transmission axes of linearly polarized light of the polarizer 909 and the analyzer 910 form an angle or 45 degree or 135 degree relative to the horizontal direction of the display face of the liquid crystal display element. In this case, when there are used liquid crystal display elements having the same constitution as those of the liquid crystal display elements 807, 808 and 809, with respect to image light which have transmitted through the liquid crystal display elements, the oscillation direction of an electric vector of linearly polarized light (hereinafter, referred to as the oscillation direction of linearly polarized light) differs between image light which is reflected once at the color synthesizing cross dichroic prism 811 and image light which is not reflected at all at the color synthesizing cross dichroic prism 811.

That is, although the red color light (R) and the blue color light (B) which have transmitted through the liquid crystal display element 807 and 808 are respectively reflected once at the color synthesizing cross dichroic prism 811, and accordingly, the oscillation directions of linearly polarized light are the same as each other. However, the green light (G)

which has transmitted through the liquid crystal display element 809 is not reflected at all at the color synthesizing cross dichroic prism 811, and accordingly, the oscillation direction of linearly polarized light is orthogonal to the oscillation direction of linearly polarized light of the other color lights.

As described above, the light emitting characteristics of the light distribution control element 100 according to the present invention are changed depending on the polarized state of the incident light. Therefore, when the light distribution control element according to the present invention is used as the transmission type screen of the conventional rear projection type display apparatus, when observed in a certain direction, an image exhibits a green color, further, when observed in the oblique direction inverse thereto, the image exhibits a magenta color.

In order to correct these, the rear projection type display apparatus 701 according to the present invention is featured in arranging the polarized state aligning means 812, 813 and 814 on the light emitting sides of the liquid crystal display elements 807, 808 and 809.

The polarized state aligning means 812, 813 and 814 are provided with a function for making the polarized states of the respective color lights coincide with each other before the respective color lights emitted from the liquid crystal display elements are projected on the transmission type screen 703.

Figure 17:
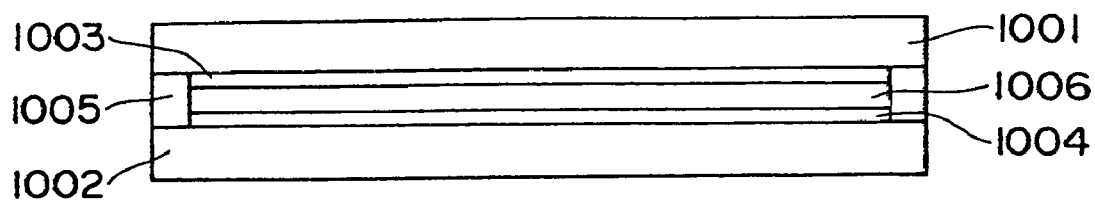
FIG. 17 is a schematic sectional view of polarized state aligning means used in a projecting apparatus according to the rear projection type display apparatus of the present invention.

FIG. 17 is a schematic sectional view showing an example of the polarized state aligning means. The polarized state aligning means is constituted of a transparent substrate 1001 formed of a polyimide-based orientation film 1003, a transparent substrate 1002 formed of a polyimide-based orientation film 1004 and a liquid crystal layer 1006 comprising nematic liquid crystals enclosed between two transparent substrates. A clearance is defined between the two transparent substrates 1001 and 1002 via a spacer, not illustrated. The two transparent substrates adhere to each other by sealing the surroundings by a sealing agent 1005, and liquid crystals are hermetically sealed.

Figure 18:
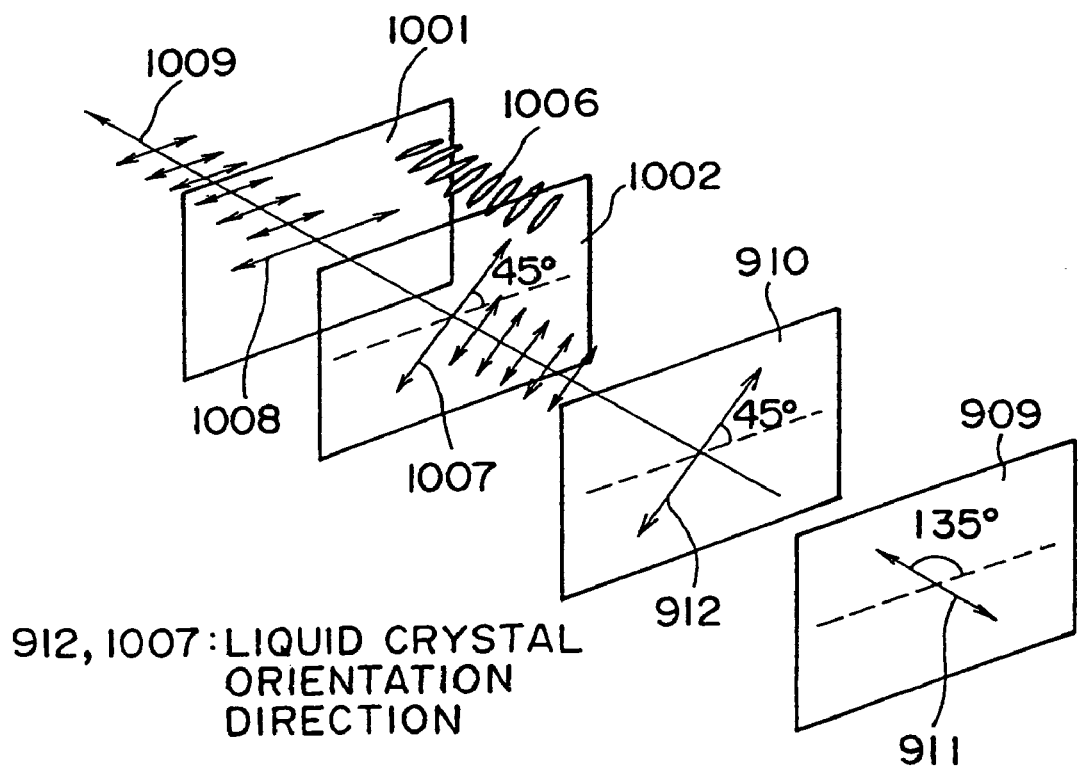
FIG. 18 is a schematic view for explaining operation of the polarized state aligning means used in the projecting apparatus according to the rear projection type display apparatus of the present invention.

FIG. 18 illustrates operation of the polarized state aligning means. For the sake of easy understanding, the orientation directions of long axes of liquid crystal molecules in the vicinity of the transparent substrates of the liquid crystal display element as well as the polarized state aligning are indicated by arrows 911, 912, 1007 and 1008, respectively.

As exemplified in FIG. 18, according to the liquid crystal layer 1006 of the polarized state aligning means, by orientation films on the two transparent substrates 1001 and 1002, the long axes of liquid crystal molecules are twisted by 45 degree between the two transparent substrates and the liquid crystal orientation direction 1008 on the side of the transparent substrate 1001 is oriented in the horizontal direction relative to a display face of the liquid crystal display element.

On the other hand, the liquid crystal orientation direction 1007 on the side of the transparent substrate 1002 on the side of the liquid crystal display element, is parallel with the liquid crystal orientation direction 912 of the transparent substrate 910 on the light emitting side of the liquid crystal display element and is inclined by 45 degree to the horizontal direction of the display face of the liquid crystal display element.

The polarized state aligning means is constituted to satisfy the condition of a waveguide in respect of a main wavelength region of incident light. The condition of the waveguide is described in a paper by C. H. Gooch and H. A. Tarry "J. Phys. D: Appl. Phys. Vol. 8 (1975), pp. 1575–1584."

That is, in order to subject light having a wavelength λ to rotary polarization by a waveguide, birefringence Δn of the liquid crystal layer 1006 of the polarized state aligning means at a layer thickness d and the wavelength λ may be set to satisfy Equation (1) shown below.

$$4d \cdot \Delta n/\lambda = \sqrt{(4m^2-1)} \tag{1}$$

where m represents an arbitrary integer.

Accordingly, d and Δn of the polarized state aligning means 812, 813 and 814 may be set to satisfy Equation (1) in respect of a main wavelength of light incident thereon, in this case, the main wavelengths of light incident on the polarized state aligning means 812, 813 and 814 are respectively set to 450 nm, 650 nm and 550 nm and m is set to 4, and d·Δn is set to 626 nm, 903 nm and 765 nm, respectively.

Further, the condition of the waveguide does not differ between an extraordinary wave mode and an ordinary wave mode, and accordingly, with regard to the orientation direction of the liquid crystal of the polarized state aligning means, the orientation directions of the two transparent substrates may be rotated by 90 degree relative to the orientation directions exemplified in FIG. 18.

By constituting in this way, when linearly polarized lights which have transmitted through the liquid crystal elements 807, 808 and 809 transmit through the polarized state aligning means 812, 813 and 814, the oscillation directions of electric vectors thereof are rotated by 45 degree to thereby constitute linearly polarized lights having the oscillation directions horizontal to the display faces of the liquid crystal display elements by which all of the polarized states of the respective color lights coincide with each other.

Further, the effect below is achieved by directing the oscillation directions of the linearly polarized lights of the respective color lights in the horizontal direction relative to the display faces, like in the present embodiment.

Generally, in a single tube type of a projecting apparatus using a plurality of two-dimensional optical switch elements, in order to synthesize optical image lights formed by the respective two-dimensional optical switch elements, a cross dichroic prism or a dichroic mirror is used.

A reflecting face of the dichroic prism or the dichroic mirror is formed by a multiple-layered film of a dielectric body, a polarized state of linearly polarized light obliquely incident thereon is changed in reflection in the case other than p polarized light in parallel with an incident face or s polarized light orthogonal to the incident face, and generally, an elliptically polarized light is constituted and the polarized state differs among respective color lights. However, as described above, when oscillation directions of pieces of linearly polarized light of respective pieces of color light are incident on a display face in the horizontal direction, that is, as the p polarized light in respect of a reflecting face of the color synthesizing dichroic prism, polarized states of the respective pieces of color light are not changed, and optical image light can be projected to the transmission type screen while the polarized states of all of the color lights coincide with each other.

That is, according to the back-face display apparatus of the present invention, the polarized states of the respective color lights projected from the projecting apparatus 701 coincide with each other, and accordingly, there is achieved an effect in which staining caused by the dependency of the light distribution characteristics on polarized light in the light distribution control element 100 used as the transmission type screen 703 is resolved and image of high grade can be provided.

Further, projected light incident on the transmission type screen 701 is the linearly polarized light having the oscillation direction in the horizontal direction relative to the display face, and accordingly, by the polarized light dependency of the light distribution characteristics in the light distribution control element 100, the viewing angle in the horizontal direction can be made wider than that in the vertical direction. This is very effective in view of distributing efficiently limited light to an observer since generally in a display apparatus a viewing angle in the horizontal direction is requested to be wider than that in the vertical direction.

When the rear projection type display apparatus having the above-described constitution is evaluated by using the light distribution control element 100 of the transmission type screen 703 in which a surface of the light distribution control element 100 on the side of the transparent base member 101 exemplified in Embodiment 1 of light distribution control element, is clad with an acrylic plate having a thickness of 2 mm, which is flat, transparent and substantially isotropic optically, wide viewing angles are provided both in two directions such as a viewing angle of about 75 degree in the horizontal direction and a viewing angle of about 45 degree in the vertical direction. Further, when observed in an oblique direction, no fringe pattern or staining is caused.

Further, unnecessary light incident on the transmission type screen from outside is absorbed by the colored adhering agent layer 103 of the light distribution control element 100, and accordingly, there is realized black display having a brightness as low as 0.5 cd/m$^2$ under a bright environment (vertical brightness: 300lx).

Further, according to the polarized state aligning means of the rear projection type display apparatus of the present invention, any means can be used so far as the means is provided with a function of making polarized states of color lights emitted from liquid crystal display elements coincide with each other, other than the means in the above-described embodiments, there can be used, for example, a polymer laminated layer film or a half wave plate having a twist structure.

The polymer laminated layer film having the twist structure used as the polarized state aligning means is realized by laminating, for example, four sheets of phase difference films made of PC films having a phase difference d·Δn=275 nm. The four sheets of phase difference films are arranged such that respective retarded phase axes thereof constitute 5.6 degree, 16.9 degree, 28.1 degree and 39.4 degree relative to a liquid crystal orientation direction of a transparent substrate on the light emitting side of a liquid crystal element from one of the films proximate to the liquid crystal display element. Also in this case, an effect similar to that in the above-described embodiments is achieved.

When a half wave plate is used as the polarized state aligning means, an effect similar to that in the above-described embodiments is achieved by arranging the half wave plate such that a retarded phase axis of the wave plate functioning as the half wave plate with regard to a wavelength of light which are transmitted through the respective liquid crystal display element, is inclined by 22.5 degree relative to a transmission axis of an analyzer of the liquid crystal display element.

Further, staining in observing in an oblique direction can be prevented to a certain degree by arranging the half wave plate as the polarized state aligning means only on the light emitting side of a liquid crystal display element which differs from other to thereby make an oscillation direction of emitted linearly polarized beam coincide with that in a polarized state of the other liquid crystal display element.

Further, although according to the above-described embodiments, an explanation has been given of the case where the transmission axis of the linearly polarized light of the analyzer of the liquid crystal display apparatus is inclined by 45 degree relative to the horizontal direction of the display face, for example, by using a liquid crystal display element previously constituted such that a transmission axis of an analyzer is directed in the horizontal direction or the vertical direction relative to the display face, the liquid crystal display element can also be provided with the function of the polarized state aligning means. In this case, the polarized states of color lights emitted from liquid crystal display elements coincide with each other even after synthesizing the colors, and accordingly, an effect similar to those in the above-described embodiments can be achieved without arranging other optical elements on the light emitting side of the liquid crystal display elements.

However, in this case, the symmetry of the contrast ratio in the horizontal direction is deteriorated, and accordingly, a projection optical system having a high F value may be used such that lateral non-symmetry of the contrast ratio cannot be recognized.

As described above, according to the rear projection type display apparatus of the present invention, the transmission type screen 703 is constituted of the light distribution control element 100 and the Fresnel lens 801*f* arranged on the light incident side. Therefore, the diverging projected light 704 from the projecting apparatus 701 is collimated by the Fresnel lens 801*f* when the light is incident on the light distribution control element 100 and the angle of incidence is substantially converted into 0 degree, and accordingly, the transmittance at the light distribution control element 100 is restrained from being reduced and a bright display image is provided.

Further, according to the present invention, by using a single tube type projecting apparatus as the projecting apparatus, color shift or staining produced by the optical characteristics of the light distribution control element 100 can be restrained and a high grade image can be provided.

Further, by making the polarized states of emitted light from the projecting apparatus coincide with each other in the color lights, there is achieved an effect of capable of eliminating staining produced when observed in an oblique direction, which is produced by the polarized light dependency of the light distribution characteristics of the light distribution control element 100. Further, the light distribution control element 100 according to the present invention used as the transmission type screen 703 is provided with characteristics of a wide viewing angle which is bright as viewed at any angle and is provided with a high effect of reducing stray light produced by outside unnecessary light, and accordingly, there is achieved an effect capable of realizing the rear projection type display apparatus achieving a wide viewing angle as well as a high contrast ratio by realizing black display having a low brightness even under a bright environment.

Further, although according to the above-described rear projection type display apparatus, the explanation has been given of the case where the plurality of two-dimensional optical switch elements are used in the projecting apparatus, there may be used a projecting apparatus of a so-called single plate type in which only one of the two-dimensional optical switch elements is used. In this case, since there is only one of the two-dimensional optical switch element inherently, and therefore, a polarized state of optical image light is uniquely determined without any aligning, and accordingly, staining is not produced by the polarized light dependency of the light distribution characteristics of the light distribution control element 100 according to the present invention.

[Embodiment 2 of Rear Projection Type Display Apparatus]

Next, an explanation will be given of another rear projection type display apparatus according to the present invention. Similarly to the above-described embodiment explained in reference to FIG. 11, the rear projection type display apparatus, described here, is provided with the projecting apparatus 701, the mirror 702 and the transmission type screen 703, the transmission type screen 703 is irradiated with the projected light beam 704 emitted from the projecting apparatus 701 via the mirror 702 to thereby display an image; however, the constitution of the projecting apparatus 701 differs therefrom partially.

Figure 19:
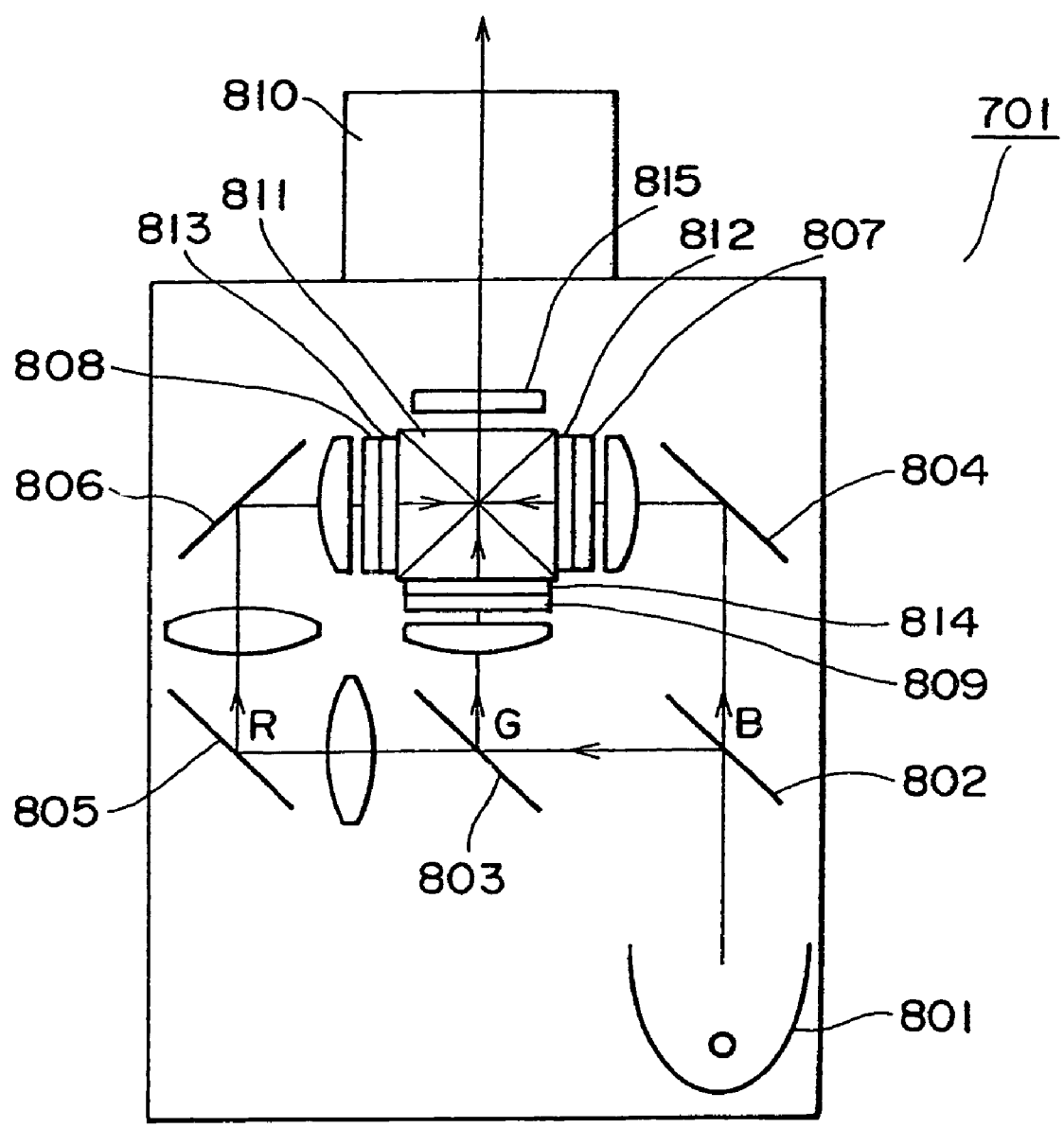
FIG. 19 is a schematic sectional view of a projecting apparatus according to a rear projection type display apparatus of the present invention.

FIG. 19 is a schematic sectional view of a projecting apparatus according to a rear projection type display apparatus in the present embodiment.

Although the projecting apparatus is basically similar to the projecting apparatus exemplified in FIG. 12, the projecting apparatus 701, described here, is featured in arranging a polarized state converting element 815 between the projecting lens 801 and the cross dichroic prism 811.

According to the projecting apparatus, similarly to the above-described embodiment, white color light emitted from the light source 801 is separated into blue color light (B), green color light (G) and red color light (R) by the color separating dichroic mirrors 802 and 803, and the separated color lights are respectively incident on the liquid crystal display elements 807, 809 and 808 via the mirrors 804, 805 and 806. The lights incident on the liquid crystal display elements are spatially modulated in accordance with image information of the respective colors and emitted, and the color lights become linearly polarized lights having a coincident oscillation direction by the polarized state aligning means 812, 813 and 814 and are incident on the color synthesizing cross dichroic prism 811.

In this case, it is preferable that the respective colors of lights incident on the color synthesizing cross dichroic prism 811 are constituted of p polarized light or s polarized light with regard to the mirror face of the prism 811. Because the mirror face of the color synthesizing prism 811 is constituted of a multiple-layered film of a dielectric body. Unless special design or film formation is carried out, when linearly polarized light obliquely incident on the mirror face is not p polarized light in parallel with the incident face or s polarized light orthogonal to the incident face, the polarized state is changed in reflection. Generally, an elliptically polarized light is constituted and the polarized states of the respective colors of pieces of light become different from each other.

An explanation will be given here of an example in the case where image light is incident on the prism 811 as p polarized light relative to the mirror face of the color synthesizing cross dichroic prism 811, that is, as linearly polarized light having an oscillation direction in the horizontal direction relative to the display face as follows.

The image light incident on and color-synthesized by the color synthesizing dichroic prism 811 is projected to the transmission type screen 703 via the polarized state converting element 815 and the projecting lens 810.

Figure 20:
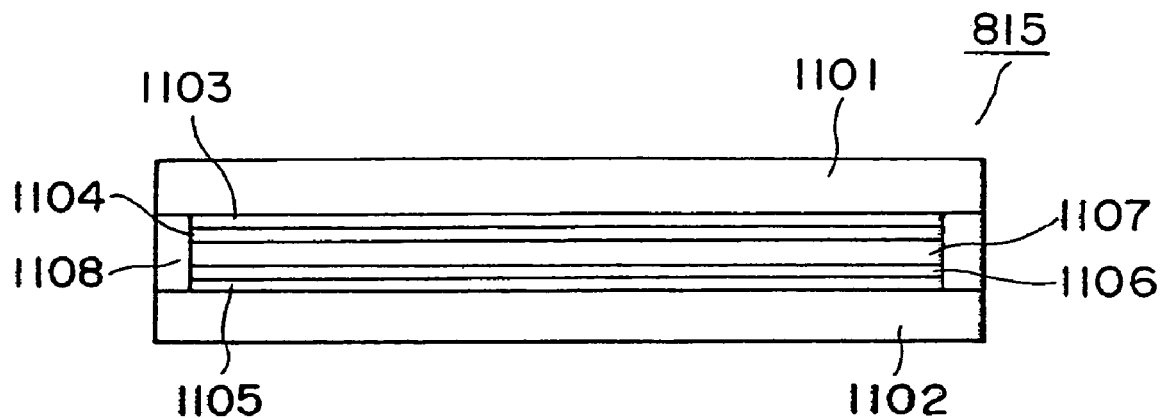
FIG. 20 is a schematic sectional view of a polarized state converting element used in the projecting apparatus according to the rear projection type display apparatus of the present invention.

The polarized state converting element 815 changes a polarized state of the image light after color-synthesizing and a liquid crystal element shown in, for example, FIG. 20 can be used therefor. The polarized state converting element 815 shown in FIG. 20 is constituted of a first transparent glass substrate 1101 laminated with a transparent electrode 1103 composed of ITO and an orientation film 1104 composed of a polyimide-based polymer over the entire face thereof, a second transparent glass substrate 1102 similarly laminated with a transparent electrode 1105 and an orientation film 1106 over the entire face thereof and a liquid crystal layer 1107 defining a clearance between two glass substrates 1101 and 1102 via a spacer, not illustrated, and comprising nematic liquid crystals having a positive dielectric anisotropy which are enclosed in a space defined by sealing the surroundings with a sealing agent 1108.

There are constituted a so-called TN liquid crystal element in which the long axes of liquid crystal molecules of the liquid crystal layer 1107 are continuously twisted by 90 degree between the two substrates by carrying out orientation processing such as rubbing processing on the orientation films 1104 and 1106 respectively formed at the two sheets of transparent glass substrates 1101 and 1102.

Figure 21:
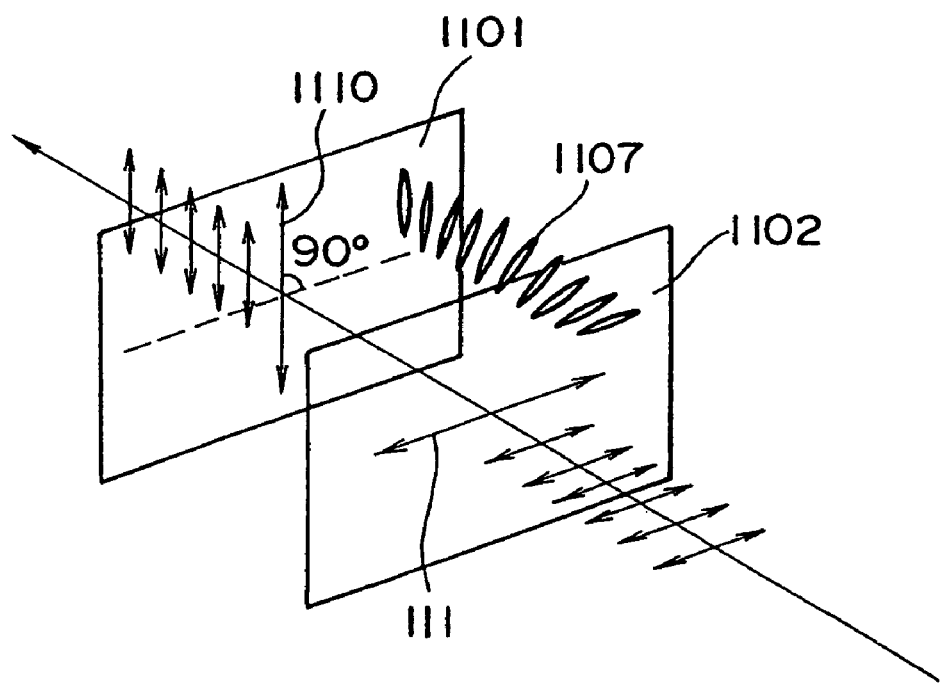
FIG. 21 is a schematic view for explaining operation of the polarized state converting element used in the projecting apparatus according to the rear projection type display apparatus of the present invention.
Figure 22:
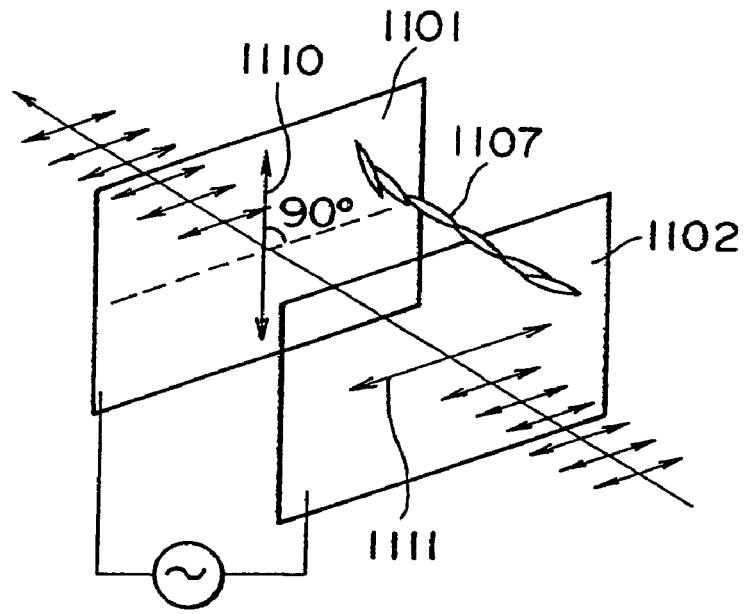
FIG. 22 is a schematic view for explaining operation of a polarized state converting element used in a projecting apparatus according to a rear projection type display apparatus of the present invention.

Next, an explanation will be given of operation of the polarized state converting element 815 in reference to the drawings. FIG. 21 and FIG. 22 are schematic views for explaining operation of the polarized state converting element 815 and arrows 1110 and 1111 respectively indicate orientation directions of liquid crystals at the transparent glass substrates 1101 and 1102.

The orientation direction 1111 of the liquid crystals at the transparent glass substrate 1102 on the light incident side is parallel with (or orthogonal to) the oscillation direction of the electric vector of incident and linearly polarized light, and the liquid crystal layer 1107 satisfies the condition of a waveguide in a visible wavelength region.

Therefore, when an electric field is not applied to the liquid crystal layer 1107 of the polarized state converting element 815, as exemplified in FIG. 21, optical image light incident on the polarized state converting element 815 becomes linearly polarized light in which the oscillation direction of the electric vector is rotated by 90 degree, that is, linearly polarized light having the oscillation direction in the vertical direction relative to the display face and is projected on the transmission type screen 703 via the projecting lens 810.

Similarly to the above-described embodiment, the transmission type screen 703 used in the back-face projection display apparatus is constituted of a light distribution control element using spherical transparent beads as micro-lenses and a Fresnel lens.

In this case, as described above, when projected light incident on the transmission type screen 703 is linearly polarized light having the oscillation direction in the vertical direction relative to the display face, by the polarized light dependency of the light distribution characteristics of the light distribution control element 100, the viewing angle in the vertical direction becomes wider than that in the horizontal direction.

Further, as exemplified in FIG. 22, when molecular long axes of liquid crystal molecules are made substantially orthogonal to the transparent glass substrates by applying a voltage across the transparent electrode 1103 and the transparent electrode 1105 formed on the two sheets of transparent glass substrates and applying an electric field to the liquid crystal layer 1107, optical image light incident on the polarized state converting element 815 transmits therethrough without almost any change in the polarized state. That is, the linearly polarized light having the oscillation direction in the horizontal direction relative to the display face is projected as it is to the transmission type screen 703 via the projecting lens 810. In this case, by the polarized light dependency of the light distribution characteristics of the light distribution control element 100 constituting the transmission type screen 703, the viewing angle in the horizontal direction becomes wider than that in the vertical direction.

That is, although according to the conventional rear projection type display apparatus, the viewing angle characteristics cannot be changed unless the transmission type screen is replaced, according to the rear projection type display apparatus of the present invention, there is achieved an epoch-making effect in which the viewing angle characteristics can be easily changed by a simple operation of controlling the electric field applied to the liquid crystal layer of the polarized state converting element 815.

Further, an ECB (Electrically Controlled Birefringence) liquid crystal element can be used for the polarized state converting element 815 of the rear projection type display apparatus according to the present invention other than the above-described TN liquid crystal element. In this case, a difference from the TN liquid crystal element is only a portion related to the liquid crystal layer such as the thickness of the liquid crystal layer or the orientation direction of liquid crystal molecules. Therefore, an explanation will be given of the schematic sectional view of the TN liquid crystal element exemplified in FIG. 20.

Similarly to the polarized state converting element 815 constituted of the above-described TN liquid crystal element, the polarized state converting element 815 constituted of the ECB liquid crystal element is constituted of the first transparent glass substrate 1101 laminated with the transparent electrode 1103 composed of ITO and the orientation film 1104 composed of a polyimide-based polymer over the entire face, the second transparent glass substrate 1102 similarly laminated with the transparent electrode 1105 and the orientation film 1106 over the entire face and the liquid crystal layer 1107 defining the clearance between the two sheets of transparent glass substrates via a spacer, not illustrated, and comprising nematic liquid crystals enclosed in the space defined by connecting the surroundings by the sealing agent 1108.

Although the dielectric anisotropy of nematic liquid crystals may be positive or negative, the orientation of liquid crystals is set to homogeneous orientation in the case of nematic liquid crystals having positive dielectric anisotropy or to homeotropic orientation in the case of nematic liquid crystals having negative dielectric anisotropy.

In this case, in order to align the orientation direction of liquid crystals when an electric field is applied to the liquid crystal layer 1107, in either of the cases, a pretilt angle of about 1 through 4 degree is formed and the orientation processing is carried out such that a direction of molecular long axes of liquid crystals becomes a direction of 45 degree relative to the display face.

When the thickness of the liquid crystal layer 1107 is represented by d and refractive index anisotropy of liquid crystals are represented by n, d·$\Delta$n is set to be equal to or larger than $\lambda$/2 ($\lambda$ is central wavelengths of optical image light).

According to the polarized state converting element 815 constituted in this way, by applying a voltage across the transparent electrodes 1103 and 1105 formed on the two sheets of transparent glass substrates and applying an electric field to the liquid crystal layer 1107, an apparent value d·$\Delta$n of the liquid crystal layer 1107 can be controlled in a range of 0 through $\lambda$/2 relative to incident optical image light.

Therefore, when the apparent value of d·$\Delta$n of the liquid crystal layer 1107 is 0, optical image light incident on the polarized state converting element 815 transmits therethrough without almost any change of the polarized state, and accordingly, the optical image light is incident on the transmission type screen 703 as linearly polarized light having the oscillation direction in the horizontal direction relative to the display face. In this case, by the polarized light dependency of the light distribution characteristics of the light distribution control element 100 constituting the transmission type screen 703, the viewing angle in the horizontal direction becomes wider than that in the vertical direction.

Further, when the apparent value of d·$\Delta$n of the liquid crystal layer is $\lambda$/2, image light incident on the polarized state converting element 815 becomes linearly polarized light in which the oscillation direction of the electric vector is rotated by 90 degree, that is, linearly polarized light having the oscillation direction in the vertical direction relative to the display face and is incident on the transmission type screen 703. In this case, by the polarized light dependency of the light distribution characteristics of the light distribution control element 100, the viewing angle in the vertical direction becomes wider than that in the horizontal direction.

Further, when the apparent value of d·$\Delta$n of the liquid crystal layer is $\lambda$/4, image light incident on the polarized state converting element 815 substantially becomes circularly polarized light and is incident on the transmission type screen 703. In this case, there is provided an isotropic viewing angle having the same degree both in the vertical direction and the horizontal direction.

Here, a specific explanation will be given of operation of the polarized state converting element 815 constituted of the ECB liquid crystal element in reference to FIG. 23 and FIG. 24.

There are used nematic liquid crystals having a dielectric anisotropy of $\Delta\epsilon$=−4.2 and a refractive index anisotropy of $\Delta$n=0.083 as liquid crystals of the polarized state converting elements 815 and a thickness of the liquid crystal layer is set to 3.5 μm.

Polyimide-based orientation films showing vertical orientation performance are used for the orientation films 1104 and 1105, rubbing processing is carried out in a direction constituting an angle of 45 degree relative to the horizontal direction of the display face and about 2 degree of pretilt is provided to liquid crystal molecules.

Figure 23:
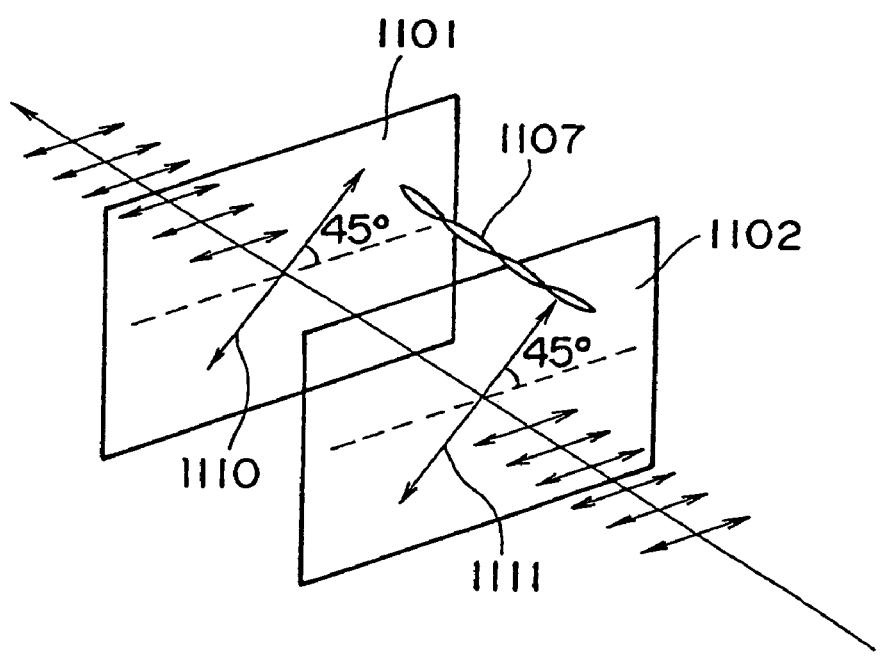
FIG. 23 is a schematic view for explaining operation of a polarized state converting element used in a projecting apparatus according to a rear projection type display apparatus of the present invention.

According to the liquid crystal layer 1107 of the polarized state converting element 815, in the case of applying no electric field, the apparent value of d·$\Delta$n of the liquid crystal layer 1107 is substantially null, as shown in FIG. 23, incident optical image light transmits therethrough without almost any change in the polarized state and is projected to the transmission type screen 703 via the projecting lens 810 in a state of linearly polarized light having the oscillation direction in the horizontal direction relative to the display face. In this case, by the polarized light dependency of the light distribution characteristics of the light distribution control element 100 constituting the transmission type screen 703, the viewing angle in the horizontal direction becomes wider than that in the vertical direction.

Figure 24:
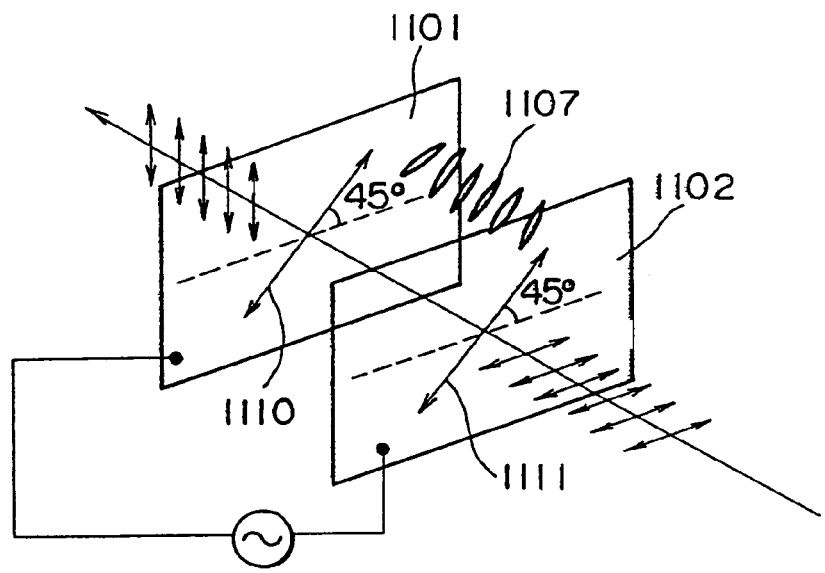
FIG. 24 is a schematic view for explaining operation of a polarized state converting element used in a projecting apparatus according to a rear projection type display apparatus of the present invention.

On the other hand, as shown in FIG. 24, when molecular long axes of liquid crystal molecules are inclined from the vertical direction to the horizontal direction relative to the transparent glass substrates by applying a voltage across the transparent electrodes formed on two sheets of the transparent glass substrates and by applying an electric field to the liquid crystal layer 1107 such that the apparent value of d·Δn of the liquid crystal layer 1107 becomes 225 nm, image light incident on the polarized state converting element 815 becomes linearly polarized light having the oscillation direction in the vertical direction relative to the display face by rotating the oscillation direction of the electric vector substantially by 90 degree, or an elliptically polarized light having a long axis in a direction substantially orthogonal to the display face and is incident on the transmission type screen 703. In this case, by the polarized light dependency of the light distribution characteristics of the light distribution control element 100 constituting the transmission type screen 703, the viewing angle in the vertical direction becomes wider than that in the horizontal direction.

Further, when by applying a voltage to the transparent electrodes formed on the two sheets of transparent glass substrates of the polarized state converting element 815 and applying an electric field to the liquid crystal layer 1107, molecular long axes of liquid crystal molecules are inclined from the vertical direction to the horizontal direction relative to the transparent glass substrates and the apparent value d·Δn of the liquid crystal layer is changed to 137.5 nm, optical image light incident on the polarized state converting element 815 becomes substantially circularly polarized light and is incident on the transmission type screen 703. In this case, an isotropic viewing angle having the same degree both in the horizontal direction and the vertical direction is provided by the characteristic of the light distribution control element 100 constituting the transmission type screen 703.

That is, although according to the conventional rear projection type display apparatus, unless the transmission type screen is replaced, the viewing angle characteristics cannot be changed, according to the rear projection type display apparatus, by controlling the electric field applied to the liquid crystal layer of the polarized state converting element 815 constituted of the TN liquid crystal element or the ECB liquid crystal element, the viewing angle characteristics can be easily changed such that the viewing angle in the horizontal direction is widened, the viewing angle in the vertical direction is widened or the isotropic viewing angle having the same degree both in the horizontal direction and the vertical direction is provided.

Further, although the description has been made on the case where the viewing angle characteristics are made variable by using the liquid crystal element as the polarized light converting element 815, other than this, desired viewing angle characteristics may be achieved by arranging, for example, a phase contrast plate as the polarized state converting element 815. For example, there are conceivable various modifications such that, for example, a quarter wave plate is arranged as the polarized light converting element 815 and an isotropic viewing angle is provided by making optical image light incident on the transmission type screen 703 by circularly polarized light.

[Embodiment 3 of Rear Projection Type Display Apparatus]

Figure 40:
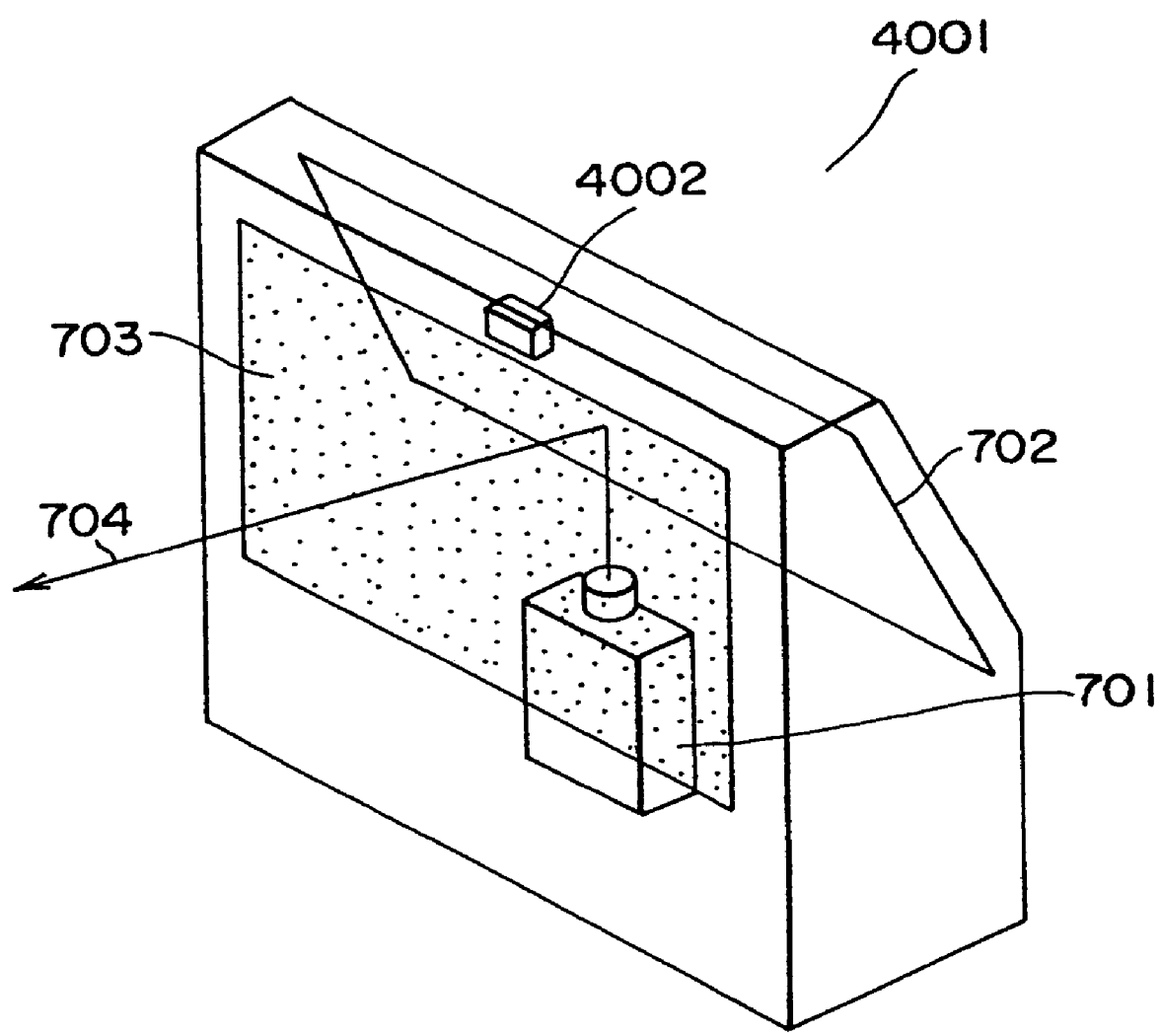
FIG. 40 is a schematic perspective view of a rear projection type display apparatus according to the present invention.

Next, an explanation will be given of a further rear projection type display apparatus according to the present invention. FIG. 40 is a schematic constitution perspective view of a rear projection type display apparatus in the present embodiment.

The rear projection type display apparatus in the present embodiment is constituted of the rear projection type display apparatus in Embodiment 2, mentioned above, added with an observer sensing unit 4002 for sensing presence or absence of an observer, observer position determining means (not illustrated) for receiving a sensed signal from the observer sensing unit and determining positions of an observer in the horizontal and vertical directions and control signal outputting means (not illustrated) for outputting a control signal to the polarized state converting element arranged in the projecting apparatus 701 based on the information.

The observer sensing unit 4002 is constituted of a plurality of observer sensing sensors. The observer sensing sensors sense the observer present in a plurality of partitioned regions. An infrared ray sensor is used for the observer sensing sensor.

Figure 41:
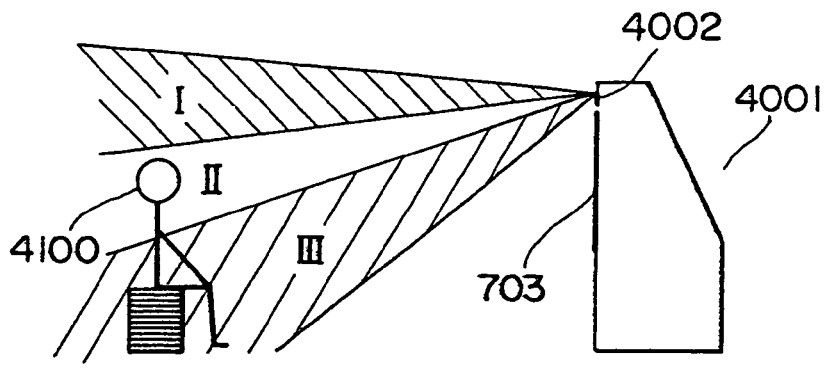
FIG. 41 is an explanatory view exemplifying a partitioned region sensed by an observer sensing unit of the rear, projection type display apparatus according to the present invention.
Figure 42:
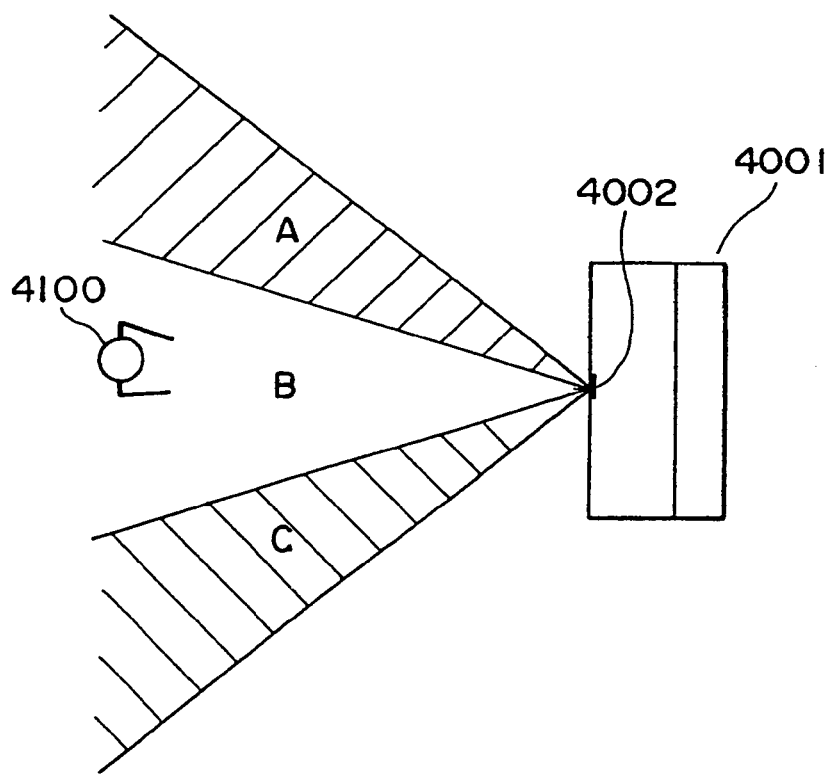
FIG. 42 is an explanatory view exemplifying the partitioned region sensed by the observer sensing unit of the rear projection type display apparatus according to the present invention.

FIG. 41 and FIG. 42 exemplify the partitioned regions sensed by the observer sensing sensors. FIG. 41 shows the case where the vertical direction is partitioned in three regions of I, II and III, and FIG. 42 shows the case where the horizontal direction is partitioned into three regions of A, B and C. According to the example, there are needed nine of the observer sensing sensors for sensing the observer 4110.

The nine observer sensing sensors provided at the above-described observer sensing unit 4002 sense the observer 4100 observing in front of a rear projection type display apparatus 4001, and the observer position determining means determines at which region (position) in the vertical and the horizontal directions the observer 4100 is present based on the respective sensed signals. Based on information of the observer position determining means, the control signal outputting means outputs a control signal to the polarized state converting element of the projecting apparatus 701.

In this case, similarly to Embodiment 2 described above, the rear projection type display apparatus in the present embodiment can change the viewing angle characteristics of the transmission type screen 703 by changing the polarized state of the projected light beam 704 by the polarized light converting element in the projecting apparatus 701. That is, by sensing and determining the positions of the observer, the polarized state converting unit is controlled and the polarized state of the projected light beam 704 is converted into a pertinent state, to thereby provide bright image to the observer.

Next, an explanation will be given of the effect of the back-face projection display apparatus in reference to FIG. 43 and FIG. 44. Generally, according to the rear projection type display apparatus, in order to effectively distribute limited light in a direction of the observer, the viewing angle in the vertical direction is set to be narrower than the viewing angle in the horizontal direction. As exemplified in FIG. 43, over the entire face of the screen 703, an effective range providing image having the uniform brightness is narrow in the vertical direction. Therefore, the observer 4100 cannot be provided with an excellent image quality unless the observer is seated on a chair and observes the image at a suitable height or the observer observes the image with a constant distance held therebetween.

Figure 43:
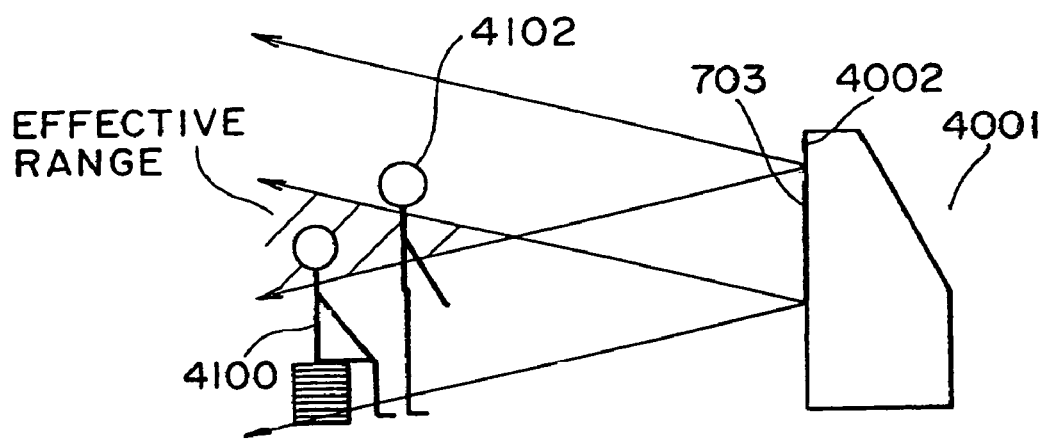
FIG. 43 is a view for explaining an effect of the rear projection type display apparatus according to the present invention.

Accordingly, as exemplified in FIG. 43, there poses a problem that although the observer 4100 can observe an excellent image when the observer is seated on a chair, the image at the lower portion of the screen 703 becomes dark and no excellent image can be observed.

However, according to the rear projection type display apparatus, when the observer stands up, the observer 4102 who stands up is sensed by the observer sensing unit 4002 and the position of the observer is determined by the observer position determining means based on the sensed signal. Further, by controlling the polarized state converting element by the control signal outputting means based on the position information of the observer and converting the polarized state of the projected light beam into a pertinent state, as exemplified in FIG. 44, an excellent image can be provided to the observer 4102 who stands up by enlarging the viewing angle in the vertical direction.

More specifically, in the state exemplified in FIG. 43, by constituting the projected light projected to the screen 703 by linearly polarized light having the oscillation direction in the horizontal direction relative to the display face of the screen 703, the viewing angle characteristics have the viewing angle in the horizontal direction wider than that in the vertical direction.

Figure 44:
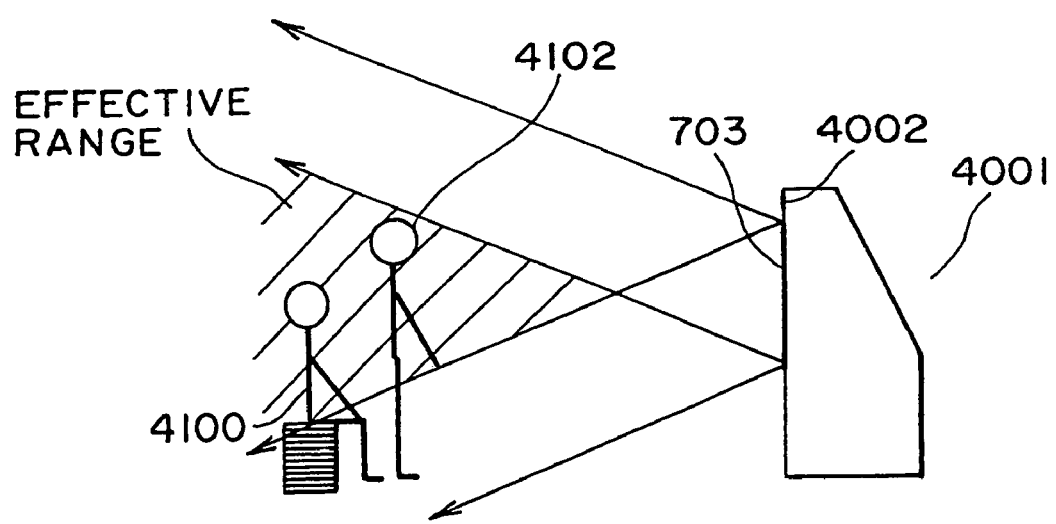
FIG. 44 is a view for explaining the effect of the rear projection type display apparatus according to the present invention.

However, when the observer stands up, by controlling the polarized state converting element based on the sensed signal from the observer sensing unit 4002 and converting the projected light beam into linearly polarized light having the oscillation direction in the vertical direction relative to the display face of the screen 703, as exemplified in FIG. 44, an excellent image can be provided to the observer 4102 by widening the viewing angle in the vertical direction.

As described above, according to the rear projection type display apparatus, the viewing angle characteristics are automatically changed in accordance with the positions of the observer and limited image light can effectively distributed in the direction of the observer, and accordingly, the observer can be provided with an excellent image at an arbitrary position.

[Embodiment 4 of Rear Projection Type Display Apparatus]

Next, an explanation will be given of a still further rear projection type display apparatus according to the present invention. Although the rear projection type display apparatus in the present embodiment is similar to the above-described embodiments explained in reference to FIG. 11, the constitution of the two-dimensional optical switch element used in the projecting apparatus 701 differs from each other.

The rear projection type display apparatus is featured in that the two-dimensional optical switch element used in the projecting apparatus 701 does not use polarized light in display and the display is carried out in an unpolarized state to thereby constitute a feature of basically solving the problem of occurrence of a fringe pattern caused by optical anisotropy of the transparent base member of the light distribution control element 100 constituting the transmission type screen 703 or a change in chromaticity caused by the polarized light dependency of the light distribution characteristics of the light distribution control element.

Although the two-dimensional optical switch element which does not use polarized light is variously conceivable, in this case, an explanation will be given firstly of the case where a polymer dispersion type liquid crystal element is used as a scattering type display element.

As polymer dispersion type liquid crystal elements, there are an element in which nematic crystals contained in microcapsules and having positive dielectric anisotropy are dispersed in a polymer, an element in which liquid crystal droplets are dispersed in a polymer matrix, an element in which a polymer in a net mesh shape is formed in a liquid crystal continuous layer, and so on.

Figure 25:
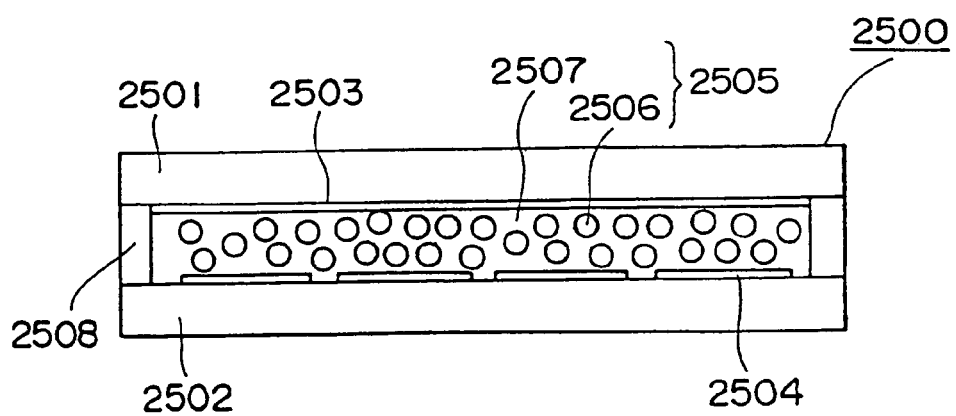
FIG. 25 is a schematic sectional view of a polymer dispersion type liquid crystal display element of a projecting apparatus according to a rear projection type display apparatus of the present invention.

FIG. 25 is a schematic sectional view showing an example of a polymer dispersion type liquid crystal. The polymer dispersion type liquid crystal 2500 is constituted of a first transparent glass substrate 2501 formed of a transparent electrode 2503 composed of ITO over the entire face thereof, a second transparent glass substrate 2502 having a transparent electrode 2504 forming pixels as well as wirings, not illustrated, switching elements of thin film transistors or the like connected thereto, and a polymer dispersing liquid crystal layer 2505 formed between two sheets of the transparent glass substrates 2501 and 2502 connected to each other via a sealing agent 2508.

The polymer dispersing liquid crystal layer 2505 is dispersed with liquid crystal droplets 2506 having positive dielectric anisotropy in a polymer 2507 of polyvinyl alcohol or the like and a refractive index in a direction of a short axis of a liquid crystal molecule substantially coincides with a refractive index of the polymer.

Figure 26A:
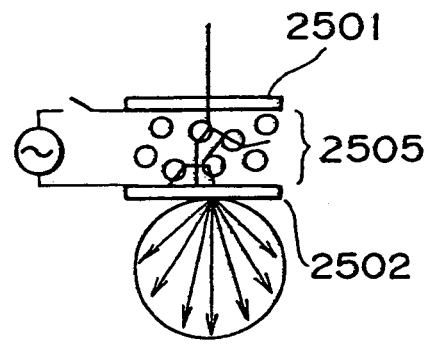
FIGS. 26A–B are schematic views for explaining operation of the polymer dispersion type liquid crystal display element.
Figure 26B:
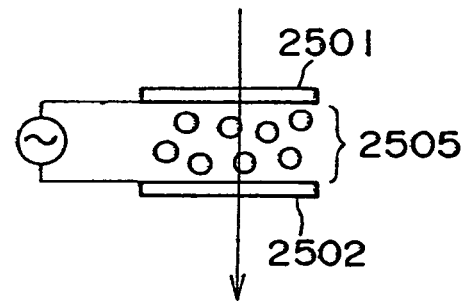

FIG. 26 illustrates operation of the polymer dispersion type liquid crystal element. When an electric field is not applied to the polymer dispersing liquid crystal layer 2505, liquid crystals of the polymer dispersing liquid layer 2505 are arranged irregularly by undergoing influence of anchoring by side walls of a polymer, the shape of a wall face, surface energy or the like. Therefore, in the polymer dispersing liquid crystal layer 2505, small particles having a refractive index distribution from a refractive index ne in a direction of a long axis of the liquid crystal molecule to a refractive index no in a direction of the short axis of the liquid crystal molecule, are floated in the polymer matrix having a refractive index of no, and incident light is refracted at interfaces having different refractive indices and is scattered.

In the meantime, when a voltage is applied to the transparent electrodes on the transparent glass substrates 2501 and 2502 and an electric field is applied to the liquid crystals, the molecular long axes of the liquid crystals are arranged in a direction orthogonal to the transparent glass substrates, the refractive indices of the liquid crystals viewed in the progressing direction of light become constant to be no and coincide with the refractive index of the polymer matrix. Therefore, the incident light transmits through the interfaces between the liquid crystals and the polymer without being scattered.

In this way, according to the polymer dispersion type liquid crystal element, the degree of scattering of light can be changed by applying or not applying the electric field to the polymer dispersing liquid crystal layer 2505. However, an amount of transmitting light cannot be changed, and accordingly, there is needed an optical system for converting the degree of scattering light into brightness of light in order to use this for display. As is well known, for such an object, a schlieren optical system is used.

Figure 27:
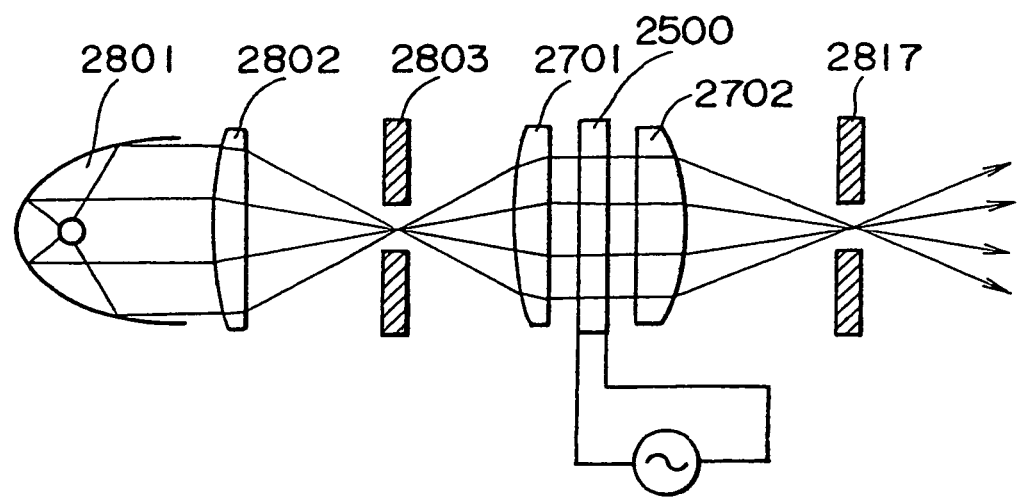
FIG. 27 is a schematic view for explaining an optical system for carrying out display by the polymer dispersion type liquid crystal display element.
Figure 28:
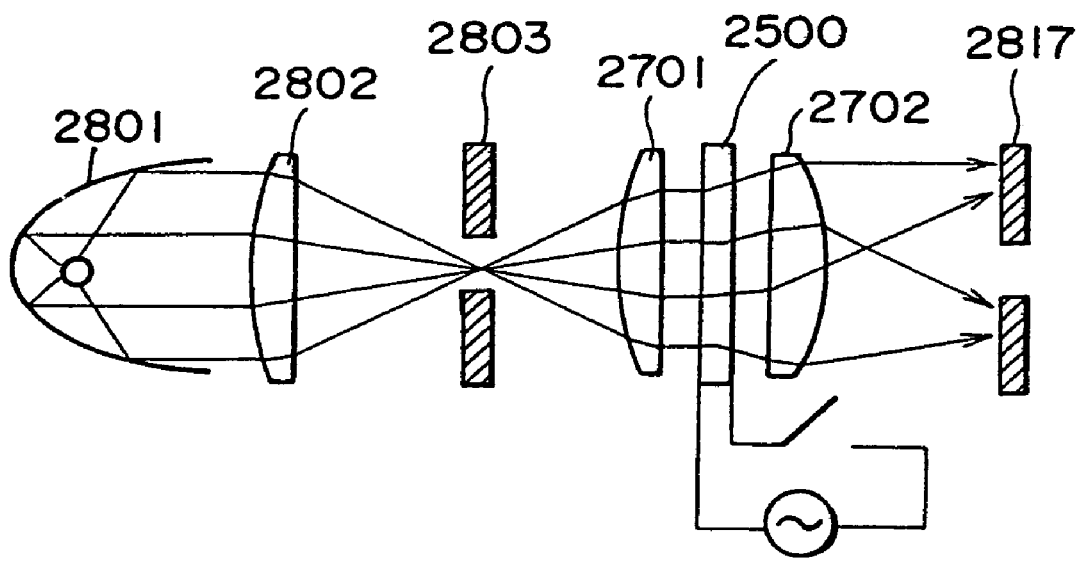
FIG. 28 is a schematic view for explaining the optical system for carrying out display by the polymer dispersion type liquid crystal display element.

FIG. 27 and FIG. 28 are schematic views for explaining display operation of the polymer dispersion type liquid crystal element using the schlieren optical system. A substantially parallel light ray emitted from a light source 2801 is converged to an opening portion of an incident side diaphragm 2803 by operation of a converging lens 2802 and the light which has transmitted through the opening portion of the incident side diaphragm 2803 is collimated by a lens 2701 into a substantially parallel ray and is incident on a polymer dispersion type element 2500. As illustrated, when a sufficient electric field is applied to the polymer dispersing liquid crystal layer of the polymer dispersion type liquid crystal element 2500, light incident on the polymer dispersion type liquid crystal element 2500 transmits therethrough substantially as the collimated light, is converged by a converging lens 2702, and transmits through an opening portion of an emitting side diaphragm 2817.

In the meantime, as shown in FIG. 28, when the electric field is not applied to the polymer dispersing liquid crystal layer of the polymer dispersion type liquid crystal element 2500, light incident on the polymer dispersion type liquid crystal element 2500 is scattered and can hardly transmit through the opening portion of the emitting side diaphragm 2817. Therefore, by using light transmitting through the emitting side diaphragm 2817 for display, display of the brightness can be carried out.

Next, an explanation will be given of a projecting apparatus using the polymer dispersion type liquid crystal element as the two-dimensional optical switch element.

Figure 29:
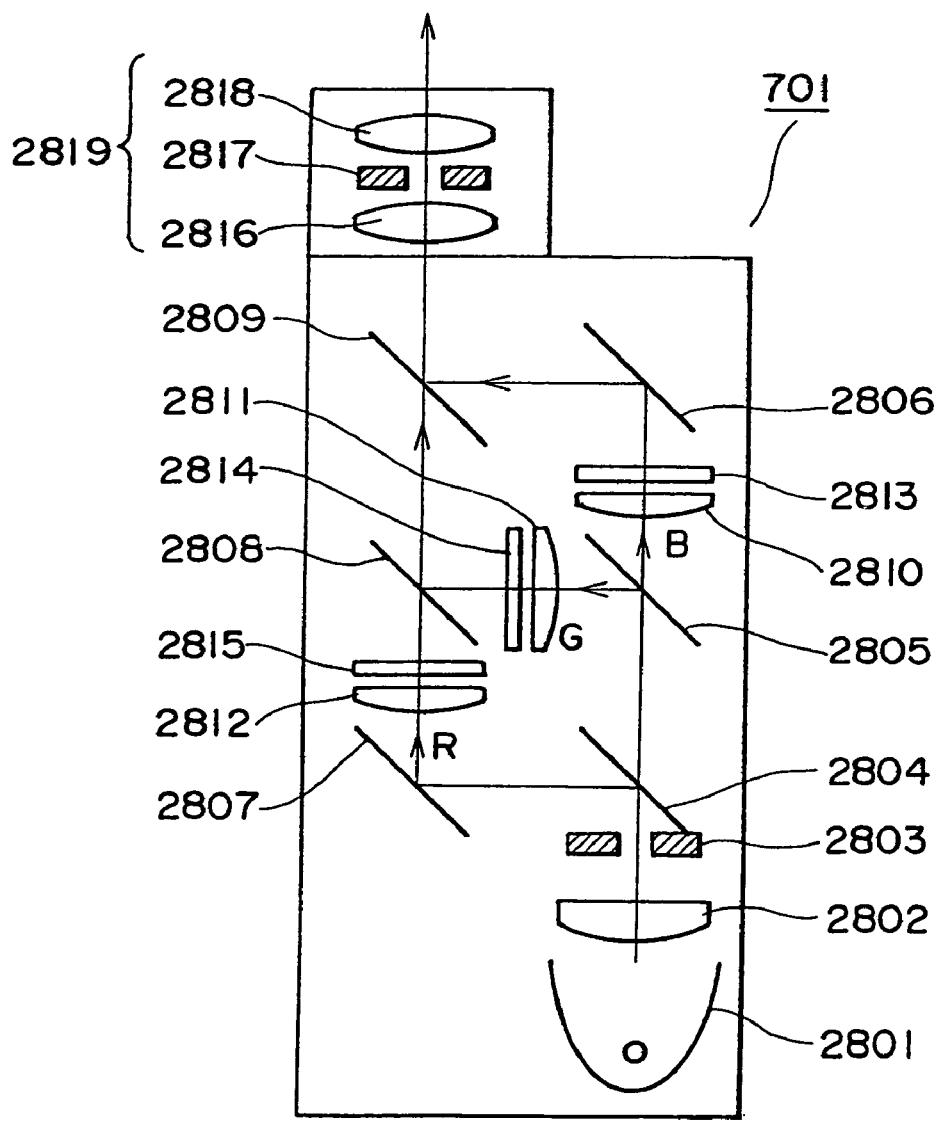
FIG. 29 is a schematic sectional view of a projecting apparatus according to a rear projection type display apparatus of the present invention.

FIG. 29 is a schematic sectional view showing an example of a projecting apparatus using the polymer dispersion type liquid crystal element.

A light source 2801 is constituted of a reflector in a shape of hyperboloid of revolution and a metal halide lamp provided with a light emitting unit at a focal position of the reflector, and most of light emitted from the light emitting unit is reflected by the reflector, substantially collimated and is emitted. Light emitted from the light source 2801 becomes white color light without any ultraviolet ray or infrared ray by transmitting through an UV and IR cut filter (not illustrated) and is converged to the opening portion of the incident side diaphragm 2803 by operation of the incident side converging lens 2802.

According to the white color light which has transmitted through the incident side diaphragm 2803, a red color light component thereof is reflected by a red color reflecting dichroic mirror 2804, and the reflected red color light is incident on an incident side lens 2812 via a total reflection mirror 2807, is collimated by operation of the incident side lens and is incident on a polymer dispersion type liquid crystal element 2815.

In the meantime, a green color light component in the light which has transmitted through the red color light reflecting dichroic mirror 2804, is reflected by a green color light reflecting dichroic mirror 2805, is incident on an incident side lens 2811, is collimated by the operation and is incident on a polymer dispersion type liquid crystal element 2814.

Further, blue color light which has transmitted through the green color light reflecting dichroic mirror 2805 is incident on an incident side lens 2810, is collimated by the operation and is incident on a polymer dispersion type liquid crystal element 2813.

The color lights incident on the polymer dispersion type liquid crystal elements 2813, 2814 and 2815 are emitted from the polymer dispersion type liquid crystal elements such that scattering states thereof are controlled in accordance with image information. The red color light which has transmitted through the polymer dispersion type liquid crystal element 2815 is incident on a projecting lens 2819 by transmitting through a green color light reflecting dichroic mirror 2808 and a blue color light reflecting dichroic mirror 2809.

Further, the green color light which has transmitted through the polymer dispersion type liquid crystal element 2814 is reflected by the green color light reflecting dichroic mirror 2808, is synthesized with the red color light, transmits through the blue color light reflecting dichroic mirror 2809, and is incident on the projecting lens 2819. The blue color light which has transmitted through the polymer dispersion type liquid crystal element 2813 is reflected by a total reflection mirror 2806 and the blue color light reflecting dichroic mirror 2809, synthesized with the red color light and the green color light, and is incident on the projecting lens 2819.

The projecting lens 2819 is constituted of a rear group lens 2816 and a front group lens 2818 and the emitting side diaphragm 2817 arranged therebetween.

The rear group lens 2816 of the projecting lens 2819 and the incident side lenses 2810, 2811 and 2812 bring the emitting side diaphragm 2817 of the projecting lens and the incident side diaphragm 2803 into a relationship conjugated with each other. Accordingly, among lights incident on the projecting lens 2819, light of pixel which has not undergone a scattering operation at the polymer dispersion type liquid crystal elements 2813, 2814 and 2815, transmits through the emitting side diaphragm 2817 and constitutes bright display.

On the other hand, part or almost all of light of pixel which has undergone the scattering operation in the polymer dispersion type liquid crystal elements 2813, 2814 an 2815 cannot transmit through the emitting side diaphragm 2817, and accordingly, the dark display is constituted.

In this way, optical image light projected from the projecting apparatus is brought into a state of substantially unpolarized light since polarized light is not utilized in display. That is, optical image light incident on the transmitting type screen 703 is unpolarized light, and accordingly, even when the transparent base member of the light distribution control element 100 constituting the transmitting type screen, is provided with birefringence, there is solved the problem of occurrence of a fringe pattern caused by optical anisotropy of the transparent base member and the change in chromaticity caused by the polarized light dependency of the light distribution characteristics of the light distribution control element. That is, there may be used a transparent body having optical anisotropy as the transparent base member of the light distribution control element, and accordingly, a more inexpensive material having a higher strength can be used.

As described above, constitution, in place of a film having inconsiderable birefringence, that is, an inexpensive film having a weak strength such as a TAC film, an inexpensive film having a high strength such as a biaxially elongated PET film can be used as a member of the light distribution control element and the transmitting type screen of the rear projection type display apparatus can be realized at a low cost.

Here, an explanation will be given of the light distribution control element 100 used in the present embodiment. The light distribution control element 100 is provided with a constitution similar to that exemplified in FIG. 1 and FIG. 2. A flat biaxially-elongated PET film having a thickness of 120 μm is used for the transparent base member 101. According to the biaxially-elongated film, compared with a non-elongated film, tensile strength or impact strength is increased and physical properties such as transparency and a range of temperature used are remarkably promoted.

The light distribution control element 100 is fabricated by a method described below. A transparent adhering agent layer comprising a polyester-based hot melt adhering agent is formed on the surface of the transparent base member 101 by 5 μm, a colored adhering agent layer in which 10 parts by weight of carbon black is blended to the polyester-based hot melt adhering agent is formed thereon by 4.5 μm and the layers are once solidified.

Transparent beads made by glass in a spherical shape having a refractive index of 1.935 (wavelength: 589.3 nm) and a diameter of 50 μm are arranged to disperse densely thereon and the transparent beads are pressed to the side of the transparent base member by a pressing plate while softening the transparent adhering agent layer and the color adhering agent layer in a thermostatic chamber to thereby embed and fixedly bond the beads into the adhering agent layers. The thickness of the adhering layers after fixing the transparent beads is about 21 μm as a total of those of the transparent adhering agent layer and the colored adhering agent layer and about 58% of the diameter of the transparent beads is exposed from the adhering agent layers.

A flat transparent acrylic plate which is optically isotropic and has a thickness of 2 mm is pasted on a surface of the light distribution control element 100 on the side of the transparent base member 101. Further, a Fresnel lens is arranged on the side of the transparent beads 105 to thereby constitute the transmission type screen 703 and the screen as the two-dimensional optical switch element is integrated with the projecting apparatus 701 using the polymer dispersion type liquid crystal elements and the mirror 702 to thereby realize the rear projection type display apparatus as shown in FIG. 11.

When the rear projection type display apparatus is evaluated, the polarized states of the respective pieces of color light projected from the projecting apparatus 701 coincide with each other as unpolarized light, and there can be provided high grade image having neither staining nor fringe pattern caused by the polarized light dependency of the light distribution characteristics of the light distribution control element 100 constituting the transmission type screen 703. Further, a wide isotropic viewing angle is provided such that 60 degree both in the horizontal direction and the vertical direction is achieved.

Unnecessary light incident on the transmitting type screen from outside is absorbed by the colored adhering agent layer of the color distribution control element, and accordingly, there is realized black display having a brightness as low as 0.5 cd/m² under a bright environment (vertical brightness: 3001x) and the high contrast ratio is achieved even under the bright environment.

Further, as the two-dimensional optical switch element in which polarized light is not used for display, there can be used a digital mirror device (DMD) disclosed in U.S. Pat. Nos. 5,061,049, 5,083,857 or U.S. patent application Ser. Nos. 08/161,832 and 08/171,303 and so on.

The DMD, described above, is provided with an array of very small mirrors corresponding to pixels supported by twisted hinges and address electrodes on a semiconductor substrate and when a voltage is applied to the address electrode, the very small mirror is deflected or rotated by electrostatic pulling force.

Accordingly, when incident light is reflected toward projecting lens, bright display is constituted and when incident light is reflected toward light absorbing means, dark display is constituted. That is, the display can be carried out by unpolarized light, and accordingly, like the rear projection type display apparatus using the polymer dispersion type liquid crystal element even when a transparent base member of a light distribution control element used as a transmission type screen is optically anisotropic, there can be provided a high grade image having neither staining nor fringe pattern caused by polarized light dependency of light distribution characteristics.

[Embodiment 5 of Rear Projection Type Display Apparatus]

Next, an explanation will be given of a further rear projection type display apparatus according to the present invention. Similarly to the above-described embodiments explained in reference to FIG. 11, the rear projection type display apparatus, described here, is provided with the projecting apparatus 701, the mirror 702 and the transmission type screen 703, and the transmission type screen 703 is irradiated with the projected light beam 704 emitted from the projecting apparatus 701 via the mirror 702 to thereby display an image; however, the constitution of the projecting apparatus 701 differs from each other.

One of essential points of the present invention resides in that image light incident on the light distribution control element 100 constituting the transmission type screen 703 is made substantially to be unpolarized light. Therefore, in the present embodiment, this is realized by arranging polarization eliminating means for eliminating polarization between the light distribution control element and the two-dimensional optical switch element other than using a display element which can be displayed by unpolarized light as a two-dimensional optical switch element.

As the polarization eliminating means, there can be used an element for artificially forming various kinds of polarized light within a range of integrating a wavelength width, time or the like and mixing and averaging these to thereby form substantially unpolarized light in view of phase or a so-called pseudo-depolarizer.

As the depolarizer, for example, there can be used a depolarizer of Lyot in which quartz plates having a thickness of 2 mm and a thickness of 1 mm with refractive index anisotropy $\Delta n$ of 0.009 which are cut and polished in parallel with optical axes, are integrated such that retarded phase axes intersect with each other by 45 degree. By using the depolarizer, there is constituted a substantially complete depolarizer with regard to white color light. Further, there may be constituted similarly a pseudo-depolarizer by laminating a polymer liquid crystal film or a phase difference film in which $d \cdot \Delta n$ is made sufficiently larger than a visible wavelength when a film thickness is designated by d and refractive index anisotropy is designated by $\Delta n$.

Figure 30:
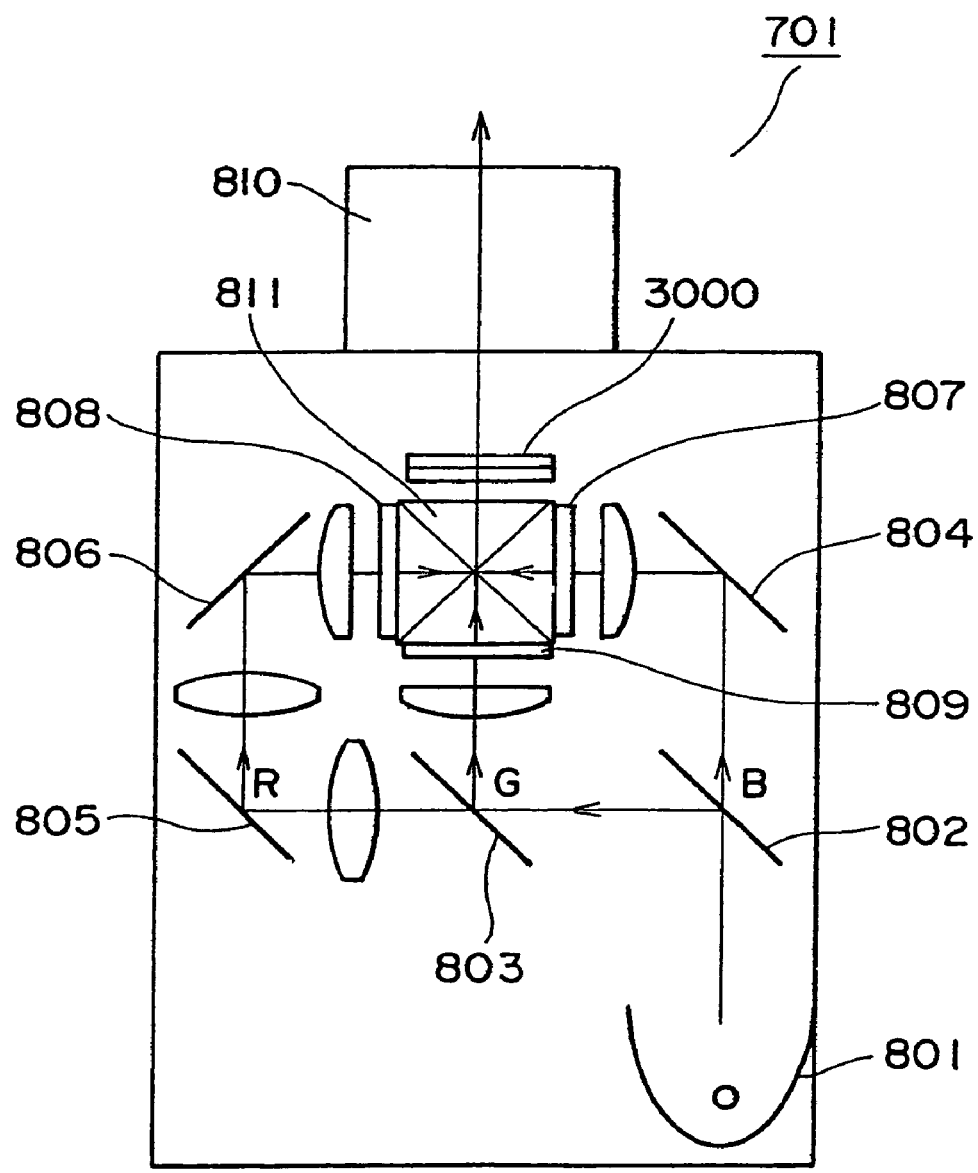
FIG. 30 is a schematic sectional view of a projecting apparatus according to a rear projection type display apparatus of the present invention.

As illustrated in, for example, a projecting apparatus shown in FIG. 30, such a pseudo-depolarizer may be arranged in an optical path after color lights which have transmitted through the two-dimensional optical switch elements 807, 808 and 809 have been subjected to color synthesis. In FIG. 30, a pseudo-depolarizer 3000 is arranged in the projecting apparatus using the TN liquid crystal display elements explained in the above-described embodiments.

Thereby, optical image light, in which polarized light can be substantially eliminated can be projected on the transmission type screen 703.

That is, the polarized states of the respective pieces of color light projected from the projecting apparatus 701 coincide with each other as substantially unpolarized light, and accordingly, there can be provided a high grade image having neither staining nor fringe pattern caused by the polarized light dependency of the light distribution characteristics of the light distribution control element. Further, as the transparent base member 101 of the light distribution control element 100, there may be used a transparent body having optical anisotropy, and therefore, a range of selecting a material for the transparent base member 101 is widened, and a more inexpensive material having high strength can be used.

Further, although according to the rear projection type display apparatus, described above, the explanation has been given of the two-dimensional optical switch element of the projecting apparatus using the transmission type liquid crystal display element, the present invention is not limited thereto, but the switch element may be a display element of a reflection type.

Further, there may be provided a liquid crystal display element having a display mode not only of the TN mode but also of a VA (Vertical Aligned) mode, an ECB mode, an OCB mode, an STN (Super Twisted Nematic) mode or the like, or a liquid crystal display element using ferroelectric liquid crystals or inverted ferroelectric liquid crystals.

[Embodiment 1 of Liquid Crystal Display Apparatus]

Figure 31:
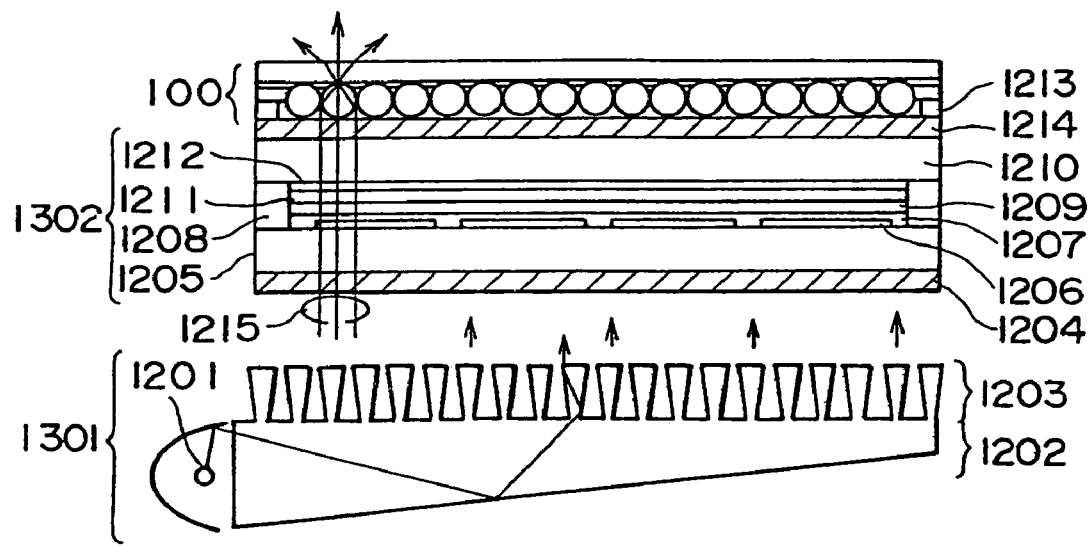
FIG. 31 is a schematic sectional view of a liquid crystal display apparatus according to the present invention.

FIG. 31 is a schematic sectional view of a direct sight type liquid crystal display apparatus using the light distribution control element according to the present invention.

The liquid crystal display apparatus according to the present invention is constituted of a liquid crystal display element 1302, a backlight apparatus 1301 provided at a rear face thereof, a polarizer 1204 and an analyzer 1214 respectively arranged on the rear face and a front face of the liquid crystal display element 1302 and the light distribution control element 100 according to the present invention provided on a front face of the analyzer 1214.

The backlight apparatus 1301 can efficiently emit substantially parallel light and there can be used "a backlight integral member for electro-optical display" disclosed in, for example, International Patent Publication No. 505412/1997 or International Publication No. WO95/14255.

In this case, there is used a backlight apparatus constituted of a light source 1201 comprising a cold cathode tube, a light guiding member 1202 composed of a transparent acrylic resin, and a light collimating means 1203.

As the light collimating means 1203, there can be used a well-known element, for example, an array of micro taper rods in a quadrangular prism optically coupled to the light guiding member 1202 shown in FIG. 31. In this case, light guided by the light guiding member 1202 is totally reflected by wall faces of the micro taper rod once or more, is substantially collimated and is emitted.

As the light collimating means 1203 other than this, a micro prism sheet or an array of micro lenses can be used. By using the backlight apparatus having such a light collimating element 1203, there is provided irradiation light substantially collimated within 10 degree of a half value angle.

The liquid crystal display element 1302 is provided with a first transparent substrate 1210 having a transparent electrode 1212 composed of ITO and an orientation film 1211 composed of a polyimide-based polymer, an orientation film 1207, a transparent electrode 1206 forming pixels, a second transparent substrate 1205 having wirings, not illustrated, switching elements of thin film transistors or the like connected thereto and a liquid crystal layer 1209 composed of nematic liquid crystals having positive dielectric anisotropy enclosed between the two sheets of transparent substrates 1212 and 1210 connected via a sealing agent 1208.

The liquid crystal display element 1302 constitutes a so-called TN liquid crystal display element in which long axes of liquid crystal molecules in the liquid crystal layer 1209 are continuously twisted by 90 degree between the two sheets of transparent substrates by carrying out rubbing processing to the orientation films 1207 and 1211 provided to the two sheets of transparent substrates 1205 and 1210.

The polarizer 1204 and the analyzer 1214 are respectively arranged at a light incident face and a light emitting face of the above-described liquid crystal display element 1302 such that linearly polarized lights orthogonal to each other are transmitted therethrough. There are used the polarizer 1204 and the analyzer 1214 in each of which TAC protective layers are provided on both faces of a film provided with a polarized light function by making elongated PVA absorb iodine, and the polarizer 1204 and the analyzer 1214 adhere to optically couple to the transparent substrate 1205 and the transparent substrate 1210 respectively by an acrylic-based adhering agent.

The light distribution control element 100 is arranged at a front face of the analyzer 1214. As the light distribution control element 100, there is used an element explained in Embodiment 1 of the light distribution control element. Although the light distribution control element 100 adheres to the analyzer 1214 by an adhering agent 1213 which is patterned to surround a display portion of the liquid crystal display element in this case, the adherence may be carried out by filling a clearance between transparent beads of the light distribution control element 100 and the analyzer 1214 by a transparent adhering agent having a low refractive index over the entire face thereof or both procedures may be used.

Next, an explanation will be given of operation of the above-described direct sight type display apparatus. In emitting light 1215 emitted from the backlight apparatus 1301, linearly polarized light which has transmitted through the polarizer 1204, transmits through the liquid crystal panel 1302 and is incident on the analyzer 1214. At this occasion, a polarized state of light transmitting through the liquid crystal panel 1302 is changed by an electric field applied to the liquid crystal layer 1209, and accordingly, by applying an electric field corresponding to image information on the liquid crystal layer 1209, an image can be formed by controlling an amount of light transmitting through the analyzer 1214. Image light which has transmitted through the analyzer 1214 is incident on the light distribution control element 100.

Most of light incident on the light distribution control element 100 is incident on the transparent beads of the light distribution control element 100 is converged by its refracting action and is diverged.

Here, there is a viewing angle dependency in a general TN liquid crystal display apparatus and when observed in an oblique direction, there are caused a reduction in the contrast ratio, conversion of a gray scale and a change in color tone. Accordingly, a range of providing an excellent image quality is limited to a range in the vicinity of a front face.

Further, according to the color distribution control element 100, as described above, when an angle of incidence of incident light is increased, the transmittance is reduced by absorption of light at the colored adhering agent layer. Accordingly, in light emitted from the liquid crystal display element 1302, light having a large angle of incidence to induce deterioration of the contrast ratio, inversion of a gray scale and a change in color tone is mostly absorbed by the colored adhering agent layer.

In the meantime, light in the vicinity of the front face having substantially an angle of incidence of 0 degree providing an excellent image quality is transmitted therethrough and is isotropically diverged, and accordingly, there is provided an image having no change in color tone or inversion of a gray scale in a wide viewing angle range and having the high contrast ratio.

Further, according to the liquid crystal display apparatus, light irradiated from the backlight apparatus 1301 to the liquid crystal display element 1302 is substantially parallel light, and accordingly, when a rate of a light amount in an angle range providing an excellent image quality is increased in the liquid crystal display element 1302. At the same time, an optical loss at the light distribution control element 100 is reduced and an efficiency of utilizing light is increased, and accordingly, there is provided an image having the high brightness and the high contrast. Further, the light distribution control element 100 is provided with a high effect of reducing stray light produced by outside unnecessary light, and accordingly, dark display having low brightness is realized even under a bright environment and an image having the high contrast ratio can be provided.

When the liquid crystal display apparatus having the above-described constitution is evaluated, there is no change in color tone or inversion of a gray scale in a range of a viewing angle of 80 degree, and there is provided an isotropic and wide viewing angle having the contrast ratio of 100:1 or more.

Further, normally, according to a TN liquid crystal display apparatus, in order to ensure symmetry of the contrast ratio in the horizontal direction, it is general to arrange the transmission axes of linearly polarized light of the polarizer and the analyzer to constitute an angle of 45 degree relative to the horizontal direction of the display face.

However, according to the liquid crystal display apparatus of the present invention, by isotropically diverging image light having a viewing angle providing an excellent image quality in the vicinity of 0 degree, a wide viewing angle is provided, and accordingly, even when the transmission axes of linearly polarized light of the polarizer 1204 and the analyzer 1214 are not disposed to constitute 45 degree or 135 degree relative to the horizontal direction of the display face, the symmetry of the contrast ratio is maintained. Rather, in view of the polarized light dependency of the light distribution characteristics of the light distribution control element constituting the liquid crystal display apparatus, the transmission axis of linearly polarized light of the analyzer 1214 is to be arranged to substantially coincide with the horizontal direction of the display face of the liquid crystal element 1302.

Figure 32:
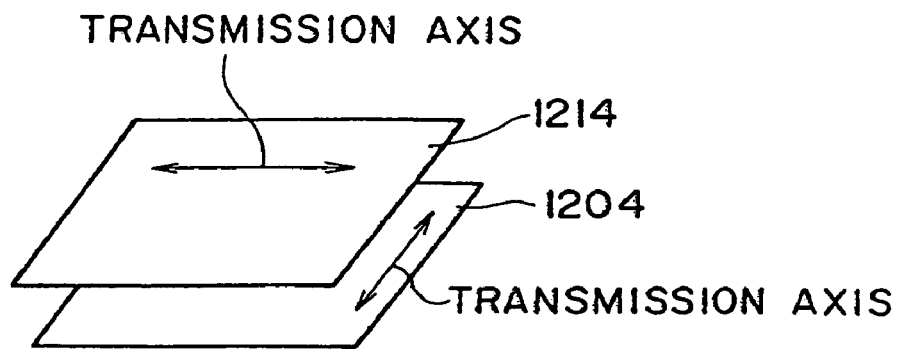
FIG. 32 is a schematic view for explaining linearly polarized light transmitting axes of a polarizer and an analyzer of the liquid crystal display apparatus according to the present invention.

That is, as shown by a schematic view of FIG. 32, the transmission axis of linearly polarized light of the polarizer 1204 is arranged in a direction vertical to the display face of the liquid crystal display apparatus and the transmission axis of linearly polarized light of the analyzer 1214 is arranged in a direction horizontal to the display face of the liquid crystal display apparatus. Accordingly, the orientation direction of liquid crystals follow the directions and the orientation direction of liquid crystals on a side of the transparent substrate 1205 is directed in a direction vertical to the display face of the liquid crystal display apparatus and the orientation direction of liquid crystals on a side of the transparent substrate 1210 is directed in a direction horizontal to the display face of the liquid crystal display apparatus, or the orientation direction of liquid crystals on the side of the transparent substrate 1205 is directed in the direction horizontal to the display face of the liquid crystal display apparatus and the orientation direction of liquid crystals on the side of the transparent substrate 1210 is directed in the direction vertical to the display face of the liquid crystal display apparatus.

By constructing in this way, light incident on the light distribution control element 100 becomes linearly polarized light having the oscillation direction in the horizontal direction relative to the display face. In this case, as described above, by the polarized light dependency of the light distribution characteristics of the light distribution control element 100, there can be provided the liquid crystal display element having the viewing angle in the horizontal direction wider than that in the vertical direction of the display face and having brightness which is symmetric in the left and right directions. This is very effective in efficiently distributing emitted light to an observer since generally in a display apparatus a viewing angle in the horizontal direction is requested to be wider than that in the vertical direction.

[Embodiment 2 of Liquid Crystal Display Apparatus]

Figure 33:
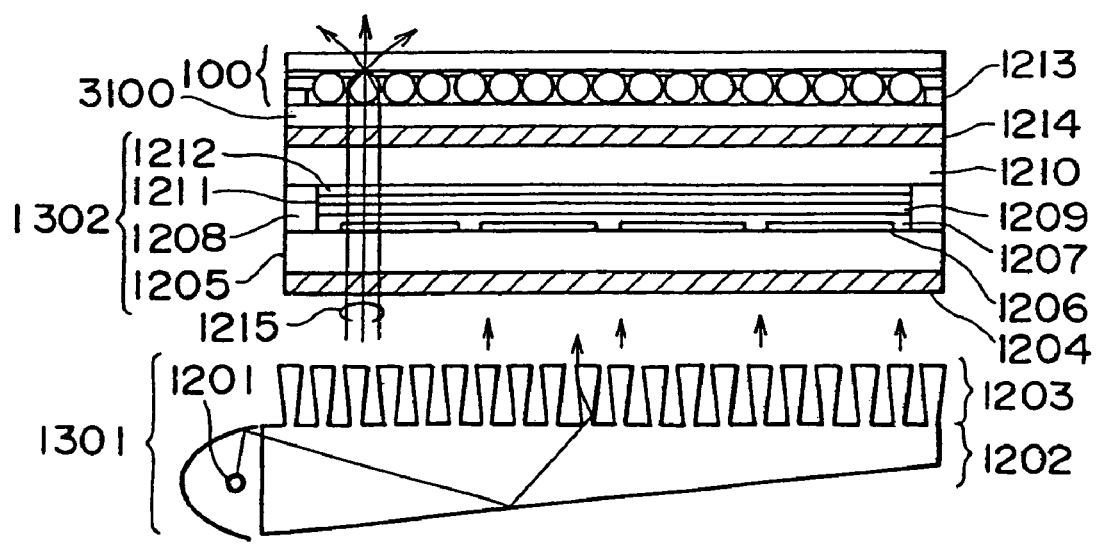
FIG. 33 is a schematic sectional view of a liquid crystal display apparatus according to the present invention.

FIG. 33 is a schematic sectional view of another direct sight type liquid crystal display apparatus according to the present invention. According to the liquid crystal display apparatus, a phase contrast plate 3100 is arranged between the analyzer 1214 and the light distribution control element 100 in the liquid crystal display apparatus shown in FIG. 31.

As described above, according to the light distribution control element 100 constituting the liquid crystal display apparatus, by the polarized state of incident light, the light distribution characteristics, that is, the viewing angle can be changed. The phase contrast plate 3100 uses the property and is provided with the function of converting linearly polarized light which has transmitted through the analyzer 1214 into polarized light providing a desired viewing angle.

For example, when a quarter wave plate is used as the phase contrast plate 3100, linearly polarized light which has transmitted through the analyzer 1214 becomes substantially circularly polarized light by the operation of the phase contrast plate 3100 and is incident on the light distribution control element 100, and there is provided an isotropic wide viewing angle to the same degree both in the horizontal direction and the vertical direction.

Further, in order to provide lateral symmetry of the contrast ratio as in the general TN liquid crystal display apparatus, the transmission axes of linearly polarized light of the analyzer 1214 and the polarizer 1204 are arranged at 45 degree or 135 degree relative to the horizontal direction, as the phase contrast plate 3100, for example, a half wave plate is arranged in a state in which a retarded phase axis thereof is inclined by 22.5 degree to the transmission axis of the analyzer and light incident on the light distribution control element 100 is converted such that the oscillation direction of the linearly polarized light is directed in the horizontal direction relative to the display face.

In this case, by only adding the phase contrast plate 3100 and the light distribution control element 100 to an existing liquid crystal display element, there can be provided a liquid crystal display element having a viewing angle in the horizontal direction wider than that in the vertical direction of the display face and brightness symmetrical in the left and right directions. Generally, according to the display apparatus, a viewing angle in the horizontal direction is requested to be wider than that in the vertical direction, which is very effective in efficiently distributing limited light to an observer.

Further, the same effect is achieved even when a polymer laminated film having a twist structure is arranged in place of the phase contrast plate 3100. Such a polymer laminated film is realized by laminating four sheets of phase difference films of PC films having a phase difference of, for example, $d \cdot \Delta n = 275$ nm and the four sheets of phase difference films may be arranged such that retarded phase axes thereof are directed to the transmission axis of the analyzer by 5.6 degree, 18.9 degree, 28.1 degree and 39.4 degree from the films proximate to the liquid crystal display element.

Further, although according to the above-described embodiments, to make the drawings easy to see, there is shown an example of a TN liquid crystal panel in a monochromatic display as the liquid crystal display element, a liquid crystal display element in a full color display providing micro color filters to a transparent substrate may be naturally used.

Further, the display mode is not limited to the TN mode, but there may be used a liquid crystal panel in a VA mode, an ECB mode, an OCB mode, an STN mode or the like. Further, in respect of the drive method, there may be constituted direct matrix driving other than active matrix driving in which switching elements such as thin film transistors are provided.

As described above, according to the light distribution control element of the present invention, there is achieved an effect of providing a wide viewing angle without any deterioration in image quality caused by occurrence of a fringe pattern even when polarized light is incident thereon by using a transparent body which is substantially isotropic optically or which is provided with uniaxial anisotropy having an in-face optical axis as the transparent base member. Accordingly, the light distribution control element according to the present invention can be used as viewing angle expanding means of a display apparatus utilizing polarized light as in a liquid crystal display apparatus.

Further, according to the rear projection type display apparatus of the present invention, the transmission type screen is constituted of the light distribution control element according to the present invention and a Fresnel lens arranged on the light incident side to thereby make the angle of incidence of projected light incident on the light distribution control element substantially 0 degree, a reduction in the transmittance at the light distribution control element is restrained and a bright display image is provided. Further, by using the single tube type projecting apparatus as the projecting apparatus, color shift or staining caused by the light incident angle dependency of the light distribution control element is not produced, and accordingly, a high grade image can be formed.

Further, in the rear projection type display apparatus according to the present invention, the polarized states of projected lights emitted from the projecting apparatus are made to coincident with each other in the respective pieces of color light to thereby eliminate staining caused by the polarized light dependency of the light distribution characteristics of the light distribution control element and provide a high grade image.

Further, the light distribution control element is provided with the bright and wide viewing angle characteristics when viewed at any angle, the effect of reducing stray light derived from outside unnecessary light is excellent, and accordingly, display of the high contrast ratio can be realized by realizing black display having low brightness even under the bright environment.

Further, in the rear projection type display apparatus according to the present invention, by using micro-lenses substantially in shapes of concentric circles as the microlenses of the light distribution control element and installing the polarized state converting element capable of changing the polarized state of light projected to the transmission type screen, there is achieved an effect in which without changing the constitution of the screen, the viewing angle characteristics of the display apparatus can be easily changed.

Further, by adding the observer sensing unit for sensing the presence or absence of an observer, the observer position determining means for determining the positions of the observer in the horizontal and the vertical directions by the sensed signal of the sensing unit and the control signal outputting means for outputting the control signal to polarized state converting element based on information of the position determining means, to the rear projection type display apparatus to thereby automatically determine the positions of the observer and change the polarized state of the projected light, the viewing angle characteristics in accordance with the positions of the observer can be achieved. That is, the viewing angle characteristics are automatically changed in accordance with the positions of the observer, limited image light can be effectively distributed to the direction of the observer, and accordingly, there is achieved an effect in which the observer can be provided with an excellent image at an arbitrary position.

Further, according to the rear projection type display apparatus of the present invention, by constituting the projected light by the projecting apparatus, which is incident on the transmission type screen by unpolarized light, there can be provided a high grade image having neither staining nor fringe pattern produced by the polarized light dependency of the light distribution characteristics of the light distribution control element.

In this case, a material having optical anisotropy may be used for the transparent base member of the light distribution control element, and accordingly, a range of selecting the material is widened and there can be achieved the transmission type screen using a more inexpensive material having high strength at a low cost.

Further, according to the liquid crystal display apparatus of the present invention, by arranging the light distribution control element according to the present invention on the surface side and using the backlight apparatus emitting the substantially parallel irradiation light, only light in a range in the vicinity of the front face can be diverged isotropically by the light distribution control element, and accordingly, there is provided the liquid crystal display apparatus of an image having no change in color tone or inversion of a gray scale and having a high contrast ratio in a wide viewing angle range.

Further, in the liquid crystal display apparatus according to the present invention, by constituting light incident on the light distribution control element by linearly polarized light having the oscillation direction in the horizontal direction relative to the display face, the viewing angle in the horizontal direction is made wider than that in the vertical direction of the display face and limited light can be effectively distributed to an observer.

Further, according to the liquid crystal display apparatus of the present invention, the polarized state of light incident on the light distribution control element can be arbitrarily changed by the phase contrast plate arranged between the analyzer and the light distribution control element, and accordingly, only by changing the phase contrast plate, a predetermined viewing angle can be provided by utilizing the polarized light dependency of the light distribution characteristics of the light distribution control element.

INDUSTRIAL APPLICABILITY

As described above, in the liquid crystal display apparatus according to the present invention, there are provided the light distribution control element without any deterioration of the image quality caused by occurrence of a fringe pattern and the display apparatus using the light distribution control element and having the high brightness, high contrast ratio and wide viewing angle.

What is claimed is:
1. A liquid crystal display apparatus comprising:
   a liquid crystal display element having a liquid crystal layer between a couple of substrates;

a backlight apparatus arranged at one side of said couple of substrates of said liquid crystal display element;

a polarizer arranged between said liquid crystal display element and said backlight apparatus;

a luminous intensity distribution control element arranged at the other side of said couple of substrates of said liquid crystal display element;

an analyzer arranged between said liquid crystal display element and said luminous intensity distribution control element, wherein said luminous intensity distribution control element comprises a transparent base member, a plural lenses arranged on said transparent base member, and a light absorbing layer having small opening portions substantially at focal positions of an individual lens of said plural lenses, and said transparent base member is constituted of a transparent body substantially optically isotropic or a transparent body having uniaxial optical anisotropy.

2. The liquid crystal display apparatus of claim 1, wherein said plural lenses of said luminous intensity distribution control element are plural spherical transparent beads;

said plural spherical beads are arranged on said transparent base member with an adhering agent layer; and said adhering agent layer is a hot-melt adhering agent layer having a transparent layer arranged at a side of said transparent base member and a coloring layer arranged on said transparent layer.

3. The liquid crystal display apparatus of claim 1, wherein a half-power angle of luminous light irradiated from said backlight apparatus is between −10 degrees and +10 degrees.

4. The liquid crystal display apparatus of claim 1, wherein a transmission axis of linearly polarized light of said analyzer is arranged so as to be parallel with a display face of said liquid crystal display element.

5. The liquid crystal display apparatus of claim 1, further comprising a phase contrast plate arranged between said analyzer and said luminous intensity distribution control element.

6. The liquid crystal display apparatus of claim 1, wherein a transparent body is arranged between said analyzer and said luminous intensity distribution control element, said transparent body having a refractive index lower than refractive indices of said luminous intensity distribution control element and said analyzer.

7. The liquid crystal display apparatus of claim 1, wherein said plural lenses of said luminous intensity distribution control element are arranged between said analyzer and said transparent base member of said luminous intensity distribution control element.

8. The liquid crystal display apparatus of claim 7, wherein an individual lens of said plural lenses is shaped in a rod.

9. The liquid crystal display apparatus of claim 7, wherein an individual lens of said plural lenses is shaped in a dome.

10. The liquid crystal display apparatus of claim 1, wherein a variation in phase difference produced by the difference in progressing angle of light progressing in said transparent base member after passing through an individual lens of said plural lenses is equal to or smaller than a half wavelength.

11. The liquid crystal display apparatus of claim 1, wherein said transparent base member is constituted of a uniaxial an isotropic transparent body having an optical axis parallel to a face of one side of said transparent base member.

12. The liquid crystal display apparatus of claim 1, wherein said transparent base member is constituted of a glass plate, a triacetyl-cellulose film, a uniaxially stretched polycarbonate film or an alicyclic acrylic resin.

* * * * *